(12) United States Patent
Tiwari et al.

(10) Patent No.: US 10,277,497 B2
(45) Date of Patent: *Apr. 30, 2019

(54) SYSTEMS AND METHODS FOR TESTING ELECTRONIC DEVICES USING MASTER-SLAVE TEST ARCHITECTURES

(71) Applicant: Contec, LLC, Schenectady, NY (US)

(72) Inventors: Rajeev Tiwari, San Jose, CA (US); Mrinal Mathur, San Jose, CA (US)

(73) Assignee: Contec, LLC, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,920

(22) Filed: Nov. 10, 2016

(65) Prior Publication Data

US 2017/0126539 A1    May 4, 2017

Related U.S. Application Data

(63) Continuation-in-part of application No. 14/929,180, filed on Oct. 30, 2015.

(51) Int. Cl.
*H04L 12/26* (2006.01)
*H04L 12/28* (2006.01)

(52) U.S. Cl.
CPC .......... *H04L 43/50* (2013.01); *H04L 12/2801* (2013.01)

(58) Field of Classification Search
CPC ............................ H04L 12/2801; H04L 43/50
See application file for complete search history.

(56) References Cited

U.S. PATENT DOCUMENTS

| 5,005,197 A | 4/1991 | Parsons et al. |
| 5,897,609 A | 4/1999 | Choi et al. |
| 5,910,977 A | 6/1999 | Torregrossa |
| 5,917,808 A | 6/1999 | Kosbab |

(Continued)

FOREIGN PATENT DOCUMENTS

| CN | 202261360 U | 5/2012 |
| WO | 2001013604 A2 | 2/2001 |

(Continued)

OTHER PUBLICATIONS

International Application No. PCT/US2016/053768, International Search Report and Written Opinion dated Feb. 3, 2017.

(Continued)

*Primary Examiner* — Khaled M Kassim
(74) *Attorney, Agent, or Firm* — Taylor English Duma LLP

(57) ABSTRACT

A system may include a master test system and a plurality of slave test systems coupled to the master test system and/or each other. The system may include devices under test (DUTs) (also referred to herein as units under test (UUTs)) stored in test slots and coupled to the master test system or specific slave test systems over Ethernet, coaxial, or other cables. Each test slot may include a Faraday cage that shields the contents therein from electromagnetic signals outside the test slot. The master test system and/or the slave test systems may test the DUTs using specific sequences of tests according to testing protocols relevant to those DUTs. One or more test controllers, mobile devices, display devices, and/or input devices may be coupled to the test systems and be used to control specific test protocols performed by the test systems.

9 Claims, 19 Drawing Sheets

(56) References Cited

U.S. PATENT DOCUMENTS

| | | | |
|---|---|---|---|
| 6,088,582 A * | 7/2000 | Canora | G01R 29/0821 455/226.1 |
| 6,308,496 B1 | 10/2001 | Lee | |
| 6,367,032 B1 | 4/2002 | Kasahara | |
| 6,662,135 B1 | 12/2003 | Burns | |
| 6,671,160 B2 | 12/2003 | Hayden | |
| 6,826,512 B2 | 11/2004 | Dara-Abrams et al. | |
| 6,859,043 B2 | 2/2005 | Ewing | |
| 7,068,757 B1 | 6/2006 | Burnett | |
| 7,254,755 B2 | 8/2007 | de Obaldia et al. | |
| 7,664,317 B1 | 2/2010 | Sowerby | |
| 7,809,517 B1 * | 10/2010 | Zuckerman | H03L 7/07 324/537 |
| 8,121,028 B1 | 2/2012 | Schlesener | |
| 8,209,732 B2 | 6/2012 | Le | |
| 8,229,344 B1 | 7/2012 | Petersen | |
| 8,324,909 B2 | 12/2012 | Oakes | |
| 8,418,000 B1 | 4/2013 | Salame | |
| 8,418,219 B1 | 4/2013 | Parsons | |
| 8,515,015 B2 | 8/2013 | Maffre | |
| 8,689,071 B2 | 4/2014 | Valakh | |
| 8,806,400 B1 | 8/2014 | Bhawmik | |
| 9,013,307 B2 | 4/2015 | Hussain | |
| 9,270,983 B1 | 2/2016 | Hare, Jr. | |
| 9,316,714 B2 | 4/2016 | Rada | |
| 9,319,908 B2 | 4/2016 | Nickel | |
| 9,372,228 B2 | 6/2016 | Nickel | |
| 9,402,601 B1 | 8/2016 | Berger | |
| 9,490,920 B2 | 11/2016 | Parte | |
| 9,491,454 B1 | 11/2016 | Kumar | |
| 9,571,211 B2 | 2/2017 | Partee | |
| 9,602,556 B1 | 3/2017 | Cham | |
| 9,609,063 B2 | 3/2017 | Zhu et al. | |
| 9,810,735 B2 | 11/2017 | Kumar et al. | |
| 9,838,295 B2 | 12/2017 | Kumar et al. | |
| 9,900,113 B2 | 2/2018 | Kumar et al. | |
| 9,900,116 B2 | 2/2018 | Kumar et al. | |
| 9,960,989 B2 | 5/2018 | Kumar et al. | |
| 9,992,084 B2 | 6/2018 | Kumar et al. | |
| 10,116,397 B2 | 10/2018 | Kumar et al. | |
| 10,122,611 B2 | 11/2018 | Kumar et al. | |
| 10,158,553 B2 | 12/2018 | Tiwari et al. | |
| 2002/0070725 A1 | 6/2002 | Hilliges | |
| 2002/0077786 A1 | 6/2002 | Vogel et al. | |
| 2003/0005380 A1 | 1/2003 | Nguyen | |
| 2003/0184035 A1 | 10/2003 | Yu | |
| 2004/0010584 A1 | 1/2004 | Peterson | |
| 2004/0016708 A1 | 1/2004 | Rafferty | |
| 2004/0160226 A1 | 8/2004 | Ewing | |
| 2004/0189281 A1 | 9/2004 | Le et al. | |
| 2004/0203726 A1 | 10/2004 | Wei | |
| 2005/0041642 A1 | 2/2005 | Robinson | |
| 2005/0053008 A1 | 3/2005 | Griesing | |
| 2005/0102488 A1 | 5/2005 | Bullis | |
| 2005/0193294 A1 | 9/2005 | Hildebrant | |
| 2005/0249196 A1 | 11/2005 | Ansari et al. | |
| 2005/0286466 A1 | 12/2005 | Tagg | |
| 2006/0015785 A1 | 1/2006 | Chun | |
| 2006/0271322 A1 | 11/2006 | Haggerty | |
| 2007/0097659 A1 | 5/2007 | Behrens | |
| 2007/0220380 A1 | 9/2007 | Ohanyan | |
| 2008/0026748 A1 | 1/2008 | Alexander et al. | |
| 2008/0117907 A1 | 5/2008 | Hein | |
| 2008/0144293 A1 | 6/2008 | Aksamit | |
| 2008/0159737 A1 * | 7/2008 | Noble | H04B 10/0773 398/16 |
| 2008/0168520 A1 | 7/2008 | Vanderhoff | |
| 2008/0274712 A1 * | 11/2008 | Rofougaran | H01P 1/20372 455/333 |
| 2008/0315898 A1 | 12/2008 | Cannon | |
| 2009/0059933 A1 | 3/2009 | Huang | |
| 2009/0089854 A1 | 4/2009 | Le | |
| 2009/0213738 A1 | 8/2009 | Volpe et al. | |
| 2009/0282446 A1 * | 11/2009 | Breed | H04L 43/50 725/106 |
| 2009/0282455 A1 | 11/2009 | Bell et al. | |
| 2009/0289020 A1 | 11/2009 | Wurmhoringer | |
| 2010/0132000 A1 | 5/2010 | Straub | |
| 2010/0138823 A1 | 6/2010 | Thornley | |
| 2010/0246416 A1 | 9/2010 | Sinha | |
| 2010/0281107 A1 | 11/2010 | Fallows et al. | |
| 2011/0001833 A1 | 1/2011 | Grinkmeyer | |
| 2011/0006794 A1 | 1/2011 | Sellathamby | |
| 2011/0012632 A1 | 1/2011 | Merrow | |
| 2011/0035676 A1 | 2/2011 | Tischer | |
| 2011/0072306 A1 | 3/2011 | Racey | |
| 2011/0090075 A1 | 4/2011 | Armitage et al. | |
| 2011/0099424 A1 | 4/2011 | Rivera Trevino | |
| 2011/0107074 A1 | 5/2011 | Chan et al. | |
| 2011/0116419 A1 | 5/2011 | Cholas | |
| 2011/0149720 A1 | 6/2011 | Phuah et al. | |
| 2011/0222549 A1 | 9/2011 | Connelly | |
| 2011/0267782 A1 | 11/2011 | Petrick | |
| 2011/0306221 A1 | 12/2011 | Reed | |
| 2012/0140081 A1 | 1/2012 | Clements | |
| 2012/0122406 A1 * | 5/2012 | Gregg | H04L 43/0882 455/67.11 |
| 2012/0163227 A1 | 6/2012 | Kannan | |
| 2012/0198084 A1 | 8/2012 | Keskitalo | |
| 2012/0198442 A1 | 8/2012 | Kashyap | |
| 2012/0213259 A1 | 8/2012 | Renken et al. | |
| 2012/0220240 A1 | 8/2012 | Rothschild | |
| 2012/0275784 A1 | 11/2012 | Soto | |
| 2012/0278826 A1 | 11/2012 | Jones | |
| 2012/0306895 A1 | 12/2012 | Faulkner et al. | |
| 2013/0033279 A1 * | 2/2013 | Sozanski | G01R 29/0821 324/750.27 |
| 2013/0049794 A1 | 2/2013 | Humphrey | |
| 2013/0076217 A1 | 3/2013 | Thompson | |
| 2013/0093447 A1 | 4/2013 | Nickel | |
| 2013/0104158 A1 | 4/2013 | Partee | |
| 2013/0160064 A1 | 6/2013 | van Rozen | |
| 2013/0167123 A1 | 6/2013 | Dura | |
| 2013/0257468 A1 * | 10/2013 | Mlinarsky | G01R 1/18 324/750.27 |
| 2013/0305091 A1 | 11/2013 | Stan et al. | |
| 2014/0047322 A1 | 2/2014 | Kim | |
| 2014/0091874 A1 * | 4/2014 | Cook | H01P 1/203 333/12 |
| 2014/0115580 A1 | 4/2014 | Kellerman | |
| 2014/0123200 A1 | 5/2014 | Park | |
| 2014/0126387 A1 | 5/2014 | Gintis | |
| 2014/0156819 A1 | 6/2014 | Cavgalar | |
| 2014/0187172 A1 * | 7/2014 | Partee | H04L 43/045 455/67.12 |
| 2014/0187173 A1 * | 7/2014 | Partee | H04B 17/00 455/67.12 |
| 2014/0207404 A1 | 7/2014 | Fritzsche | |
| 2014/0256373 A1 * | 9/2014 | Hernandez | H04B 17/12 455/509 |
| 2014/0266930 A1 | 9/2014 | Huynh | |
| 2014/0269386 A1 | 9/2014 | Chu | |
| 2014/0269871 A1 * | 9/2014 | Huynh | H04B 1/38 375/224 |
| 2014/0282783 A1 | 9/2014 | Totten | |
| 2014/0370821 A1 | 12/2014 | Guterman | |
| 2015/0024720 A1 | 1/2015 | Efrati | |
| 2015/0093987 A1 | 4/2015 | Ouyang | |
| 2015/0109941 A1 * | 4/2015 | Zhang | H04B 17/0085 370/252 |
| 2015/0151669 A1 | 6/2015 | Meisner | |
| 2015/0180743 A1 | 6/2015 | Jana et al. | |
| 2015/0226716 A1 | 8/2015 | Nelson | |
| 2015/0237010 A1 | 8/2015 | Roskind | |
| 2015/0253357 A1 | 9/2015 | Olgaard | |
| 2015/0288589 A1 | 10/2015 | Radford et al. | |
| 2015/0369851 A1 | 12/2015 | Even | |
| 2016/0080241 A1 | 3/2016 | Rocha De Maria | |
| 2016/0102951 A1 | 4/2016 | Cole | |
| 2016/0191364 A1 | 6/2016 | Ajitomi | |

(56) References Cited

U.S. PATENT DOCUMENTS

| | | | |
|---|---|---|---|
| 2016/0381818 A1* | 12/2016 | Mills | H05K 5/0217 361/724 |
| 2017/0048519 A1 | 2/2017 | Friel | |
| 2017/0089981 A1 | 3/2017 | Kumar | |
| 2017/0093682 A1 | 3/2017 | Kumar | |
| 2017/0093683 A1 | 3/2017 | Kumar | |
| 2017/0126536 A1 | 5/2017 | Kumar | |
| 2017/0126537 A1 | 5/2017 | Kumar | |
| 2017/0149635 A1 | 5/2017 | Kumar | |
| 2017/0149645 A1 | 5/2017 | Kumar | |
| 2017/0195071 A1 | 7/2017 | Kumar | |
| 2017/0250762 A1 | 8/2017 | Kumar et al. | |
| 2017/0288791 A1* | 10/2017 | Kumar | H04B 17/30 |
| 2017/0288993 A1 | 10/2017 | Kumar et al. | |
| 2017/0289012 A1 | 10/2017 | Tiwari et al. | |
| 2017/0302994 A1 | 10/2017 | Kumar | |
| 2018/0024193 A1 | 1/2018 | Kumar et al. | |
| 2018/0076908 A1 | 3/2018 | Kumar et al. | |
| 2018/0077046 A1 | 3/2018 | Kumar et al. | |
| 2018/0351846 A1 | 12/2018 | Kumar et al. | |

FOREIGN PATENT DOCUMENTS

| | | |
|---|---|---|
| WO | 2013169728 A2 | 11/2013 |
| WO | 2014035462 | 3/2014 |
| WO | 2014065843 | 5/2014 |
| WO | 2017053961 | 3/2017 |
| WO | 2017074872 | 5/2017 |

OTHER PUBLICATIONS

International Application No. PCT/US2016/058507, International Search Report and Written Opinion dated Jan. 3, 2017.
Nordman, Bruce, "Testing Products with Network Connectivity," Jun. 21, 2011 [retrieved online at http://citeseerx.ist.psu.edu/viewdoc/download?doi=10.1.1.695.772&rep=rep1&type=pdf on Feb. 6, 2017].
Kumar, Samant; Issue Notification for U.S. Appl. No. 14/866,720, filed Sep. 25, 2015, dated Oct. 18, 2017, 1 pg.
Kumar, Samant; Notice of Allowance for U.S. Appl. No. 14/948,925, filed Nov. 23, 2015, dated Sep. 20, 2017, 15 pgs.
Kumar, Samant; Supplemental Notice of Allowance for U.S. Appl. No. 14/948,925, filed Nov. 23, 2015, dated Oct. 5, 2017, 2 pgs.
Kumar, Samant; Notice of Allowance for U.S. Appl. No. 15/057,085, filed Feb. 29, 2016, dated Sep. 29, 2017, 28 pgs.
Kumar, Samant; Issue Notification for U.S. Appl. No. 14/866,780, filed Sep. 25, 2015, dated Oct. 19, 2016, 1 pg.
Kumar, Samant; Notice of Allowance for U.S. Appl. No. 14/866,780, filed Sep. 25, 2015, dated Jul. 19, 2016, 8 pgs.
Kumar, Samant; Non-Final Office Action for U.S. Appl. No. 14/866,630, filed Sep. 25, 2015, dated Aug. 9, 2017, 24 pgs.
Kumar, Samant; Non-Final Office Action for U.S. Appl. No. 14/866,720, filed Sep. 25, 2015, dated Jan. 23, 2017, 17 pgs.
Kumar, Samant; Notice of Allowance for U.S. Appl. No. 14/866,720, filed Sep. 25, 2015, dated Jun. 29, 2017, 26 pgs.
Kumar, Samant; Notice of Allowance for U.S. Appl. No. 14/866,720, filed Sep. 25, 2015, dated Aug. 28, 2017, 11 pgs.
Kumar, Samant; Response to Rule 312 Communication for U.S. Appl. No. 14/866,720, filed Sep. 25, 2015, dated Jul. 26, 2017, 2 pgs.
Kumar, Samant; Ex-Parte Quayle Office Action for U.S. Appl. No. 14/948,925, filed Nov. 23, 2015, dated Jun. 20, 2017, 29 pgs.
Kumar, Samant; Non-Final Office Action for U.S. Appl. No. 14/987,538, filed Jan. 4, 2016, dated Jul. 21, 2017, 18 pgs.
Kumar, Samant; Notice of Allowance for U.S. Appl. No. 14/987,538, filed Jan. 4, 2016, dated Mar. 23, 2017, 12 pgs.
Kumar, Samant; Non-Final Office Action for U.S. Appl. No. 15/624,961, filed Jun. 16, 2017, dated Jul. 19, 2017, 7 pgs.
Kumar, Samant; Non-Final Office Action for U.S. Appl. No. 14/929,180, filed Oct. 30, 2015, dated Aug. 22, 2017, 32 pgs.
Kumar, Samant; Non-Final Office Action for U.S. Appl. No. 14/929,220, filed Oct. 30, 2015, dated Aug. 24, 2017, 31 pgs.
Kumar, Samant; Non-Final Office Action for U.S. Appl. No. 15/057,085, filed Feb. 29, 2016, dated Apr. 7, 2017, 15 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
CED Magazine; Article entitled: "Cable Connects in Atlanta", located at <https://www.cedmagazine.com/article/2006/04/cable-connects-atlanta>, Apr. 30, 2006, 21 pgs.
Consumer Electronics Net; Article entitled: "Teleplan Enhances Test Solution Portfolio with Titan", located at <http://www.consumerelectronicsnet.com/article/Teleplan-Enhances-Test-Solution-Portfolio-With-Titan-4673561>, published on Nov. 1, 2016, 3 pgs.
Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer-1668213>, Sep. 8, 2011, 3 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
Exact Ventures; Report entitled: North American Telecommunications Equipment Repair Market, located at http://www.fortsol.com/wp-content/uploads/2016/08/Exact-Ventures-NA-Repair-Market-Report.pdf>, earliest known publication date Aug. 1, 2016, 12 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
Promptlink; Article entitled: "Cable Modem Test Platform", located at <https://www.promptlink.com/products/cmtp.html>, earliest known publication date Aug. 11, 2016, 10 pgs.
Promptlink; Article entitled: "Set-Top Box Test Platform", located at <http://promptlink.com/products/stbtp.html>, earliest known publication date Aug. 11, 2016, 7 pgs.
S3 Group; Document entitled: "White Paper: The Importance of Automated Testing in Set-Top Box Integration", earliest known publication date Jun. 17, 2014, 11 pgs.
Teleplan; Article entitled: "Screening & Testing", located at <https://www.teleplan.com/innovative-services/screening-testing/>, earliest known publication date Mar. 21, 2015, 7 pgs.
TVTechnology; Article entitled: "S3 Group's StormTest", located at <http://www.tvtechnology.com/expertise/0003/s3-groups-stormtest/256690>, published May 1, 2012, 2 pgs.
Kumar, Samant; Final Office Action for U.S. Appl. No. 15/642,915, filed Jul. 6, 2017, dated Apr. 5, 2018, 18 pgs.
Kumar, Samant; Issue Notification for U.S. Appl. No. 14/866,630, filed Sep. 25, 2015, dated Apr. 11, 2018, 1 pg.
Kumar, Samant; Supplemental Notice of Allowance for U.S. Appl. No. 14/866,630, filed Sep. 25, 2015, dated Jan. 31, 2018, 9 pgs.
Kumar, Samant; Supplemental Notice of Allowance for U.S. Appl. No. 14/866,630, filed Sep. 25, 2015, dated Mar. 30, 2018, 6 pgs.
Kumar, Samant; Certificate of Correction for U.S. Appl. No. 14/866,720, filed Sep. 25, 2015, dated Feb. 13, 2018, 1 pg.
Kumar, Samant; Notice of Allowance for U.S. Appl. No. 14/948,143, filed Nov. 20, 2015, dated Jan. 25, 2018, 13 pgs.
Kumar, Samant; Issue Notification for U.S. Appl. No. 14/987,538, filed Jan. 4, 2016, dated Jan. 31, 2018, 1 pg.
Idkumar, Samant; Issue Notification for U.S. Appl. No. 15/057,085, filed Feb. 29, 2016, dated Jan. 31, 2018, 1 pg.
Kumar, Samant; Non-Final Office Action for U.S. Appl. No. 15/642,915, filed Jul. 6, 2017, dated Nov. 1, 2017, 42 pgs.
Kumar, Samant; Notice of Allowance for U.S. Appl. No. 14/866,630, filed Sep. 25, 2015, dated Dec. 20, 2017, 19 pgs.
Kumar, Samant; Non-Final Office Action for U.S. Appl. No. 14/866,752, filed Sep. 25, 2015, dated Nov. 7, 2017, 26 pgs.

(56) References Cited

OTHER PUBLICATIONS

Kumar, Samant; Issue Notification for U.S. Appl. No. 14/948,925, filed Nov. 23, 2015, dated Nov. 16, 2017, 1 pg.
Kumar, Samant; Non-Final Office Action for U.S. Appl. No. 14/948,143, filed Nov. 20, 2015, dated Dec. 28, 2017, 39 pgs.
Kumar, Samant; Corrected Notice of Allowance for U.S. Appl. No. 14/987,538, filed Jan. 4, 2016, dated Jan. 10, 2018, 8 pgs.
Kumar, Samant; Notice of Allowance for U.S. Appl. No. 14/987,538, filed Jan. 4, 2016, dated Dec. 4, 2017, 20 pgs.
Kumar, Samant; Response to Amendment under Rule 312 for U.S. Appl. No. 14/987,538, filed Jan. 4, 2016, dated Jan. 17, 2018, 2 pgs.
Kumar, Samant; Notice of Non-Compliant Amendment for U.S. Appl. No. 15/624,961, filed Jun. 16, 2017, dated Jan. 10, 2018, 5 pgs.
Kumar, Samant; Corrected Notice of Allowance for U.S. Appl. No. 15/057,085, filed Feb. 29, 2016, dated Oct. 31, 2017, 6 pgs.
Tiwari, Rajeev; Non-Final Office Action for U.S. Appl. No. 15/624,967, filed Jun. 16, 2017, dated Nov. 7, 2017, 52 pgs.
Kumar, Samant; Notice of Allowance for U.S. Appl. No. 14/866,752, filed Sep. 25, 2015, dated May 17, 2018, 16 pgs.
Kumar, Samant; Issue Notification for U.S. Appl. No. 14/948,143, filed Nov. 20, 2015, dated May 16, 2018, 1 pg.
Kumar, Samant; Supplemental Notice of Allowance for U.S. Appl. No. 14/948,143, filed Nov. 20, 2015, dated May 7, 2018, 7 pgs.
Kumar, Samant; Notice of Allowance for U.S. Appl. No. 15/624,961, filed Jun. 16, 2017, dated May 22, 2018, 44 pgs.
Kumar, Samant; Final Office Action for U.S. Appl. No. 14/929,180, filed Oct. 30, 2015, dated May 8, 2018, 35 pgs.
Kumar, Samant; Final Office Action for U.S. Appl. No. 14/929,220, filed Oct. 30, 2015, dated May 10, 2018, 38 pgs.
Tiwari, Rajeev; Final Office Action for U.S. Appl. No. 15/624,967, filed Jun. 16, 2017, dated May 8, 2018, 40 pgs.
Kumar, Samant; International Preliminary Report on Patentability for PCT Application No. PCT/US2016/053768, Sep. 26, 2016, dated Apr. 5, 2018, 13 pgs.
Kumar, Samant; International Preliminary Report on Patentability for PCT Application No. PCT/US2016/058507, filed Oct. 24, 2016, dated May 11, 2018, 12 pgs.
Kumar, Samant; Advisory Action for U.S. Appl. No. 15/642,915, filed Jul. 6, 2017, dated Jul. 23, 2018, 18 pgs.
Kumar, Samant; Corrected Notice of Allowability for U.S. Appl. No. 14/866,752, filed Sep. 25, 2015, dated Jul. 10, 2018, 5 pgs.
Kumar, Samant; Non-Final Office Action for U.S. Appl. No. 15/624,950, filed Jun. 16, 2017, dated Jul. 9, 2018, 50 pgs.
Kumar, Samant; Corrected Notice of Allowance for U.S. Appl. No. 15/624,961, filed Jun. 16, 2017, dated Jun. 28, 2018, 7 pgs.
Kumar, Samant; Advisory Action for U.S. Appl. No. 14/929,180, filed Oct. 30, 2015, dated Jul. 27, 2018, 9 pgs.
Kumar, Samant; Advisory Action for U.S. Appl. No. 14/929,220, filed Oct. 30, 2015, dated Jul. 27, 2018, 8 pgs.
Kumar, Samant; Non-Final Office Action for U.S. Appl. No. 15/818,803, filed Nov. 21, 2017, dated Jul. 25, 2018, 46 pgs.
Tiwari, Rajeev; Advisory Action for U.S. Appl. No. 15/624,967, filed Jun. 16, 2017, dated Jul. 17, 2018, 7 pgs.
Tiwari, Rajeev; Notice of Allowance for U.S. Appl. No. 15/624,967, filed Jun. 16, 2017, dated Aug. 28, 2018, 6 pgs.
Kumar, Samant; Non-Final Office Action for U.S. Appl. No. 15/642,915, filed Jul. 6, 2017, dated Oct. 2, 2018, 15 pgs.
Kumar, Samant; Corrected Notice of Allowance for U.S. Appl. No. 14/866,752, filed Sep. 25, 2015, dated Oct. 4, 2018, 5 pgs.
Kumar, Samant; Issue Notification for U.S. Appl. No. 14/866,752, filed Sep. 25, 2015, dated Oct. 17, 2018, 1 pg.
Kumar, Samant; Notice of Allowance for U.S. Appl. No. 15/813,838, filed Nov. 15, 2017, dated Oct. 2, 2018, 52 pgs.
Kumar, Samant; Corrected Notice of Allowance for U.S. Appl. No. 15/624,961, filed Jun. 16, 2017, dated Sep. 28, 2018, 9 pgs.
Kumar, Samant; Issue Notification for U.S. Appl. No. 15/624,961, filed Jun. 16, 2017, dated Oct. 10, 2018, 1 pg.
Kumar, Samant; Non-Final Office Action for U.S. Appl. No. 14/929,180, filed Oct. 30, 2015, dated Oct. 1, 2018, 15 pgs.
Kumar, Samant; Non-Final Office Action for U.S. Appl. No. 14/929,220, filed Oct. 30, 2015, dated Oct. 1, 2018, 13 pgs.
Kumar, Samant; Final Office Action for U.S. Appl. No. 15/818,803, filed Nov. 21, 2017, dated Nov. 26, 2018, 20 pgs.
Tiwari, Rajeev; Issue Notification for U.S. Appl. No. 15/624,967, filed Jun. 16, 2017, dated Nov. 29, 2018, 1 pg.
Tiwari, Rajeev; Supplemental Notice of Allowance for U.S. Appl. No. 15/624,967, filed Jun. 16, 2017, dated Sep. 19, 2018, 7 pgs.
Kumar, Samant; Notice of Allowance for U.S. Appl. No. 16/103,546, filed Aug. 14, 2018, dated Jan. 28, 2019, 36 pgs.
Kumar, Samant; Non-Final Office Action for U.S. Appl. No. 15/722,235, filed Oct. 2, 2017, dated Jan. 8, 2019, 62 pgs.
Kumar, Samant; Corrected Notice of Allowance for U.S. Appl. No. 15/813,838, filed Nov. 15, 2017, dated Feb. 12, 2019, 6 pgs.
Kumar, Samant; Issue Notification for U.S. Appl. No. 15/813,838, filed Nov. 15, 2017, dated Jan. 9, 2019, 1 pg.
Kumar, Samant; Final Office Action for U.S. Appl. No. 15/624,950, filed Jun. 16, 2017, dated Dec. 20, 2018, 33 pgs.
Kumar, Samant; Advisory Action for U.S. Appl. No. 15/818,803, filed Nov. 21, 2017, dated Feb. 5, 2019, 13 pgs.

* cited by examiner

SYSTEMS AND METHODS FOR TESTING ELECTRONIC DEVICES USING MASTER-SLAVE TEST ARCHITECTURES

CROSS-REFERENCE TO RELATED APPLICATIONS

The present application is a continuation-in-part of U.S. patent application Ser. No. 14/929,180, filed Oct. 30, 2015 and entitled "Hardware Architecture for Universal Testing System: Cable Modem Test," which is incorporated by reference herein. The present application also incorporates by reference U.S. patent application Ser. No. 14/866,630, filed Sep. 25, 2015 and entitled "Universal Device Testing System," U.S. patent application Ser. No. 14/866,720, filed Sep. 25, 2015 and entitled "Core Testing Machine," U.S. patent application Ser. No. 14/866,752, filed Sep. 25, 2015 and entitled "Universal Device Testing Interface," U.S. patent application Ser. No. 14/866,780, filed Sep. 25, 2015 and entitled "Set Top Boxes Under Test," U.S. patent application Ser. No. 14/929,220, filed Oct. 30, 2015 and entitled "Hardware Architecture for Universal Testing System: Wireless Router Test," U.S. patent application Ser. No. 14/948,143, filed Nov. 20, 2015 and entitled "Cable Modems/eMTAs Under Test," U.S. patent application Ser. No. 14/948,925, filed Nov. 23, 2015 and entitled "Wireless Routers Under Test," and U.S. patent application Ser. No. 14/987,538, filed Jan. 4, 2016 and entitled "Test Sequences Using Universal Testing System."

TECHNICAL FIELD

Embodiments disclosed herein are directed to computer test systems, and more particularly to computer systems for managing testing of devices under test (DUTs) housed in a master test slot and one or more slave test slots.

BACKGROUND

The process of testing various types of electronic devices (e.g., cable modems, devices containing embedded Multimedia Terminal Adapters (eMTAs), mobile phones, any devices capable of wireless transmissions, etc.), is often an important part of manufacturing, quality assurance, and repair. Before many electronic devices are released to customers, for instance, manufacturers, distributors, and/or others in a supply chain may evaluate devices for irregularities and/or design defects. As another example, when customers return electronic devices still under warranty, a manufacturer may test the devices to determine causes of failure or to ensure suitability of use by another customer.

Many test procedures have involved testing ports, protocols, and/or other components of electronic devices in a controlled environment where individual attributes of these electronic devices can be assessed. As test procedures often require in-depth assessments and/or evaluations, it may be difficult to test several electronic devices at the same time. For electronic devices, such as cable modems, that have wireless components (antennas, power circuitry, transceivers, etc.), issues of electromagnetic interference (EMI) further make it further difficult. While it may be desirable to test several electronic devices at the same time, many systems and methods have not been able to do so efficiently.

SUMMARY

In various implementations, a system for testing a plurality of electronic devices is provided. The system may include a master test system and a plurality of slave test systems coupled to the master test system and/or each other using Radio Frequency (RF) coaxial cables and/or other couplers. The system may include devices under tests (DUTs) (interchangeably referred to herein as units under test (UUTs)) stored in test slots and coupled to the master test system or specific slave test systems over Ethernet, coaxial, or other cables. Each test slot may be surrounded by a Faraday cage that shields the contents therein from electromagnetic signals outside the test slot. The Faraday cage of a test slot may reduce electromagnetic interference from sources outside the test slot. In some implementations, the test systems (master test system and the slave test systems) may include test probes that interface with ports on the DUTs; the test systems may include test probe containers that virtualize the test probes and/or configure the test probes to execute portions of specific tests on DUTs. The test systems may test the DUTs using specific sequences of tests according to testing protocols relevant to those DUTs. One or more test controllers, mobile devices, display devices, and/or input devices may be coupled to the test systems and be used to control specific test protocols performed by the test systems.

In some implementations, one or more test system interface circuits may be used to couple test systems to each other. The test system interface circuits may reduce the attenuation caused by hardware elements. In various implementations, the test system interface circuits may include RF amplifiers that compensate for attenuation due to RF taps, RF coaxial cables, and/or other hardware elements. Further, in various implementations, one or more DUT interface circuits may reduce attenuation and/or other forms of degradation between test systems and DUTs. DUT interface circuits may include attenuators, splitters, filters, and/or other circuitry configured to reduce degradation between test systems and DUTs coupled thereto.

In various implementations, the master test system may comprise a cable modem termination system, resource servers, provisioning/Session Initiation Protocol (SIP) servers, call management system (CMS) servers, Data over Cable Service Interface Specification/Wide Area Network (DOCSIS/WAN) servers, a test controller servers, etc. Servers on a master test system may facilitate tests of DUTs coupled to the master test system as well as DUTs coupled to slave test systems that are in turn coupled to the master test system. The slave test system may comprise resource servers and test controller servers. In various implementations, the servers on a slave test system may facilitate tests of DUTs coupled to the slave test system.

In some implementations, a system may comprise a master test system a first device interface, a first slave test system, and a second device interface. The master test system may be configured to provide first test instructions to test a first plurality of devices under test, the first plurality of devices under test being housed in a first plurality of test slots, the first plurality of test slots being configured to protect the first plurality of devices under test from first electromagnetic interference associated with the first plurality of devices under test. The master test system may further be configured to provide second test instructions to test a second plurality of devices under test, the second plurality of devices under test being housed in a second plurality of test slots, the second plurality of test slots being configured to protect the second plurality of devices under test from second electromagnetic interference associated with the second plurality of devices under test. The first device interface may be configured to couple the master test system to the first devices under test over a first coupling, the first device interface being configured to accommodate first signal degradation due to the first coupling. The first slave test system may be configured to provide the second test instructions to the second plurality of devices under test. The second device interface may be configured to couple the first slave test system to the second devices under test over a second coupling, and may be configured to accommodate second signal degradation due to the second coupling.

In some implementations, the first signal degradation comprises a first attenuation due to the first coupling, or the second signal degradation comprises a second attenuation due to the second coupling. The first plurality of devices under test may comprise a first plurality of cable modems or a first plurality of Embedded Multimedia Terminal Adapters (eMTAs), or the second first plurality of devices under test comprises a second plurality of cable modems or a second plurality of Embedded Multimedia Terminal Adapters (eMTAs).

In various implementations, the first device interface comprises a first attenuator configured to accommodate a first attenuation due to the first coupling. The second device interface may comprise a second attenuator configured to accommodate a second attenuation due to the second coupling.

The first plurality of test slots or the second plurality of test slots may comprise Faraday cages configured to magnetically shield items housed therein. The first plurality of test slots or the second plurality of test slots may be incorporated into a test rack configured to facilitate testing of items located thereon.

In some implementations, the master test system is configured to provide third test instructions to test a third plurality of devices under test, the third plurality of devices under test being housed in a third plurality of test slots, the third plurality of test slots being configured to protect the third plurality of devices under test from third electromagnetic interference associated with the third plurality of devices under test. The system may further comprise a second slave test system, the second slave test system configured to provide the third test instructions to the third plurality of devices under test; and a third device interface configured to couple the second slave test system to the third devices under test over a third coupling, the third device interface being configured to accommodate third signal degradation due to the third coupling.

In various implementations, the first slave test system and the second slave test system are coupled to one another using a coaxial line and an amplifier, the amplifier being configured to accommodate signal degradation. The master test system and the second slave test system may be coupled to one another using a coaxial line and an amplifier, the amplifier being configured to accommodate signal degradation.

In some implementations, the system may further comprises a test controller coupled to the master test system, the test controller being configured to provide the first test instructions and the second test instructions to the master test system. The system may further comprise an input device coupled to the test controller, the input device being configured to receive identifiers of the first plurality of devices under test and the second plurality of devices under test. The test controller and the input device may be incorporated into one or more of a mobile phone, a tablet computing device, a laptop computer, and a desktop computer.

A method may comprise placing a first plurality of devices under test in a first plurality of test slots, the first plurality of test slots being configured to protect the first plurality of devices under test from first electromagnetic interference associated with the first plurality of devices under test. A second plurality of devices under test may be placed in a second plurality of test slots, where the second plurality of test slots being configured to protect the second plurality of devices under test from second electromagnetic interference associated with the second plurality of devices under test. A first device interface may be used to couple the first plurality of devices under test to a master test system over a first coupling, the first device interface being configured to accommodate first signal degradation due to the first coupling. A second device interface may be used to couple the second plurality of devices under test to a first slave test system over a second coupling, the second device interface being configured to accommodate second signal degradation due to the second coupling. The master test system may be configured to provide first test instructions to test the first plurality of devices under test. The master test system may be configured to provide second test instructions to test the second plurality of devices under test. A first slave test system may be configured to provide third test instructions to test the second plurality of devices under test.

In some implementations, the first signal degradation comprises a first attenuation due to the first coupling, or the second signal degradation comprises a second attenuation due to the second coupling. The first plurality of devices under test may comprise a first plurality of cable modems or a first plurality of Embedded Multimedia Terminal Adapters (eMTAs), or the second first plurality of devices under test comprises a second plurality of cable modems or a second plurality of Embedded Multimedia Terminal Adapters (eMTAs).

The first device interface may comprise a first attenuator configured to accommodate a first attenuation due to the first coupling. The second device interface may comprise a second attenuator configured to accommodate a second attenuation due to the second coupling.

In various implementations, the first plurality of test slots or the second plurality of test slots comprise Faraday cages configured to magnetically shield items housed therein. The first plurality of test slots or the second plurality of test slots may be incorporated into a test rack configured to facilitate testing of items located thereon.

In some implementations, the method further comprises: using a third device interface to couple the second slave test system to a third plurality of devices under test over a third coupling, the third device interface being configured to accommodate third signal degradation due to the third coupling, and the third plurality of devices under test being housed in a third plurality of test slots, the third plurality of test slots being configured to protect the third plurality of devices under test from third electromagnetic interference associated with the third plurality of devices under test; and providing third test instructions to test a third plurality of devices under test.

The method may further comprise coupling the second slave test system to the first slave test system or to the master test system.

In some implementations, the method comprises coupling a second slave test system to the master test system; using a third device interface to couple the second slave test system to a third plurality of devices under test over a third coupling, the third device interface being configured to accommodate third signal degradation due to the third coupling, and the third plurality of devices under test being housed in a third plurality of test slots, the third plurality of test slots being configured to protect the third plurality of devices under test from third electromagnetic interference associated with the third plurality of devices under test; and providing third test instructions to test a third plurality of devices under test.

The method may comprise providing, using a test controller coupled to the master test system, the first test instructions and the second test instructions to the master test system. 'In some implementations, the method may comprise receiving, using an input device coupled to the test controller, identifiers of the first plurality of devices under test and the second plurality of devices under test. In various implementations, the test controller and the input device are incorporated into one or more of a mobile phone, a tablet computing device, a laptop computer, and a desktop computer.

A method may comprise gathering first identifiers of a first plurality of devices under test coupled to a master test system. Second identifiers of a second plurality of devices under test coupled to a first slave test system coupled to the master test system may be gathered.

Shared test protocols may be identified, where the shared test protocols providing a basis to test compliance of one or more shared functional parameters shared by the first plurality of devices under test and the second plurality of devices under test. First resource test protocols may be identified, where the first resource test protocols providing a basis to test compliance of one or more resource parameters of the first plurality of devices under test. Second resource test protocols may be identified, where the second resource test protocols providing a basis to test compliance of one or more resource parameters of the second plurality of devices under test. A group of shared probes at the master test system may be configured to implement the shared test protocols on the first plurality of devices under test and the second plurality of devices under test. A first group of resource probes may be configured at the master test system to implement the first resource test protocols on the first plurality of devices under test. Instructions to configure a second group of resource probes at the first slave test system to implement the second resource test protocols on the second plurality of devices under test may be provided to the first slave test system.

In some implementations, the first plurality of devices under test are housed in a first plurality of test slots configured to protect the first plurality of test devices under test from electromagnetic interference. The second plurality of devices under test may be housed in second plurality of test slots configured to protect the second plurality of test devices under test from electromagnetic interference.

The method may comprise gathering third identifiers of a third plurality of devices under test coupled to a second slave test system; identifying third resource test protocols, the third resource test protocols providing a basis to test compliance of one or more resource parameters of the third plurality of devices under test; configuring the group of shared probes at the master test system to implement the shared test protocols on the third plurality of devices under test; and providing to the second slave test system instructions to configure a third group of resource probes at the second slave test system to implement the third resource test protocols on the third plurality of devices under test.

In various implementations, the second slave test system is coupled to one or more of the master test system and the first slave test system.

The devices under test may comprise one or more of cable modems and embedded multimedia terminal adapters (eMTAs).

In some implementations, configuring the group of shared probes comprises identifying one or more test probe containers corresponding to the group of shared probes, the one or more test probe containers comprising virtual representations of the group of shared probes. Configuring the first group of resource probes may comprise identifying one or more test probe containers corresponding to the first group of resource probes, the one or more test probe containers comprising virtual representations of the first group of resource probes.

Configuring the second group of resource probes may comprise identifying one or more test probe containers corresponding to the second group of resource probes, the one or more test probe containers comprising virtual representations of the second group of resource probes.

The shared test protocols may comprise test protocols for testing: cable modem termination system (CMTS) responses, provisioning/Session Initiation Protocol (SIP) responses, call management system (CMS) responses, and Data over Cable Service Interface Specification/Wide Area Network (DOCSIS/WAN) responses.

The method may be executed by the master test system.

A system may comprise a master test management server configured to gather first identifiers of a first plurality of devices under test coupled to a master test system, and to gather second identifiers of a second plurality of devices under test coupled to a first slave test system coupled to the master test system; a shared test protocol server configured to identify shared test protocols, the shared test protocols providing a basis to test compliance of one or more shared functional parameters shared by the first plurality of devices under test and the second plurality of devices under test; a resource identification server configured to identify first resource test protocols, the first resource test protocols providing a basis to test compliance of one or more resource parameters of the first plurality of devices under test, and to identify second resource test protocols, the second resource test protocols providing a basis to test compliance of one or more resource parameters of the second plurality of devices under test; a master probe container configured to configure a group of shared probes at the master test system to implement the shared test protocols on the first plurality of devices under test and the second plurality of devices under test, and to configure a first group of resource probes at the master test system to implement the first resource test protocols on the first plurality of devices under test; and a slave test system control server configured to provide to the first slave test system instructions a second group of resource probes at the first slave test system to implement the second resource test protocols on the second plurality of devices under test.

In various implementations, the first plurality of devices under test are housed in a first plurality of test slots configured to protect the first plurality of test devices under test from electromagnetic interference. The second plurality of devices under test may be housed in second plurality of test slots configured to protect the second plurality of test devices under test from electromagnetic interference. The second plurality of devices under test may be housed in second plurality of test slots configured to protect the second plurality of test devices under test from electromagnetic interference.

In some implementations, the master test management server is configured to gather third identifiers of a third plurality of devices under test coupled to a second slave test system; the resource identification server is configured to identify third resource test protocols, the third resource test protocols providing a basis to test compliance of one or more resource parameters of the third plurality of devices under test; and the slave test system control server is configured to provide to the second slave test system instructions to configure a third group of resource probes at the second slave test system to implement the third resource test protocols on the third plurality of devices under test. The second slave test system may be coupled to one or more of the master test system and the first slave test system.

In various implementations, the devices under test comprise one or more of cable modems and embedded multimedia terminal adapters (eMTAs). The master probe container may be configured to identify one or more test probe containers corresponding to the group of shared probes, the one or more test probe containers comprising virtual representations of the group of shared probes.

The resource identification server may be configured to identify one or more test probe containers corresponding to the first group of resource probes, the one or more test probe containers comprising virtual representations of the first group of resource probes. The resource identification server may be configured to identify one or more test probe containers corresponding to the second group of resource probes, the one or more test probe containers comprising virtual representations of the second group of resource probes. The shared test protocols may comprise test protocols for testing: cable modem termination system (CMTS) responses, provisioning/Session Initiation Protocol (SIP) responses, call management system (CMS) responses, and Data over Cable Service Interface Specification/Wide Area Network (DOCSIS/WAN) responses.

These and other technical solutions will become apparent to those skilled in the relevant art upon a reading of the following descriptions and a study of the several examples of the drawings.

DETAILED DESCRIPTION

Methods, systems, user interfaces, and other aspects of the invention are described. Reference will be made to certain implementations of the invention, examples of which are illustrated in the accompanying drawings. While the invention will be described in conjunction with the implementations, it will be understood that the description is not intended to limit the invention to these particular implementations alone. On the contrary, the invention covers alternatives, modifications and equivalents that are within the spirit and scope of the invention. The specification and drawings are to be regarded in illustrative rather than restrictive.

In the following description, numerous specific details are set forth to provide a thorough understanding of the present invention. However, the invention may be practiced without these particular details. In other instances, methods, procedures, components, and networks that are well known to those of ordinary skill in the art are not described in detail to avoid obscuring aspects of the present invention.

Figure 1:
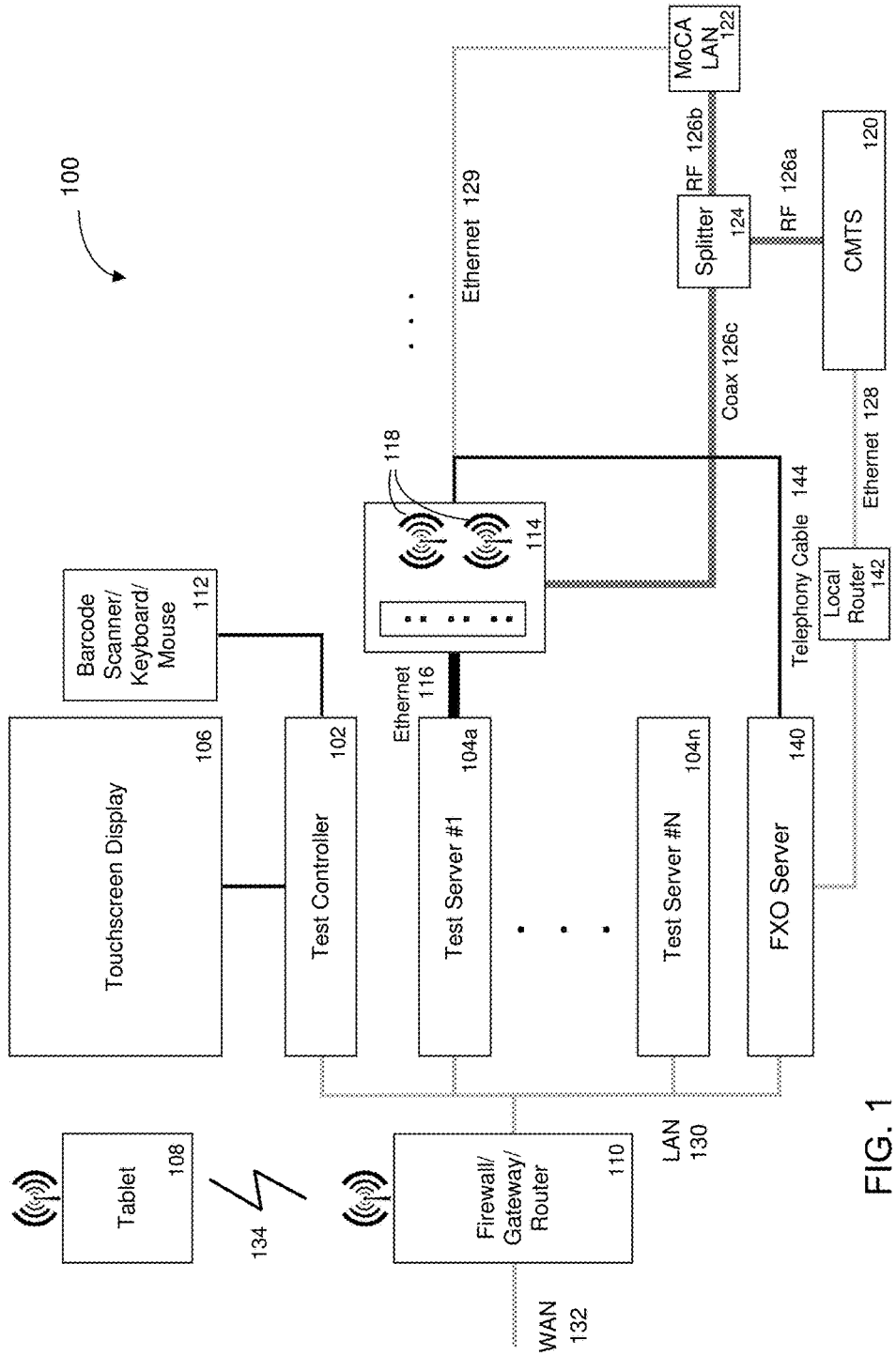
FIG. 1 illustrates a high-level hardware architecture of a universal testing system for cable modem tests, according to certain implementations.

FIG. 1 illustrates a high-level hardware architecture of a universal testing system for cable modem tests, according to certain implementations. FIG. 1 shows a test station 100 that includes a test controller 102, a plurality of test systems (servers) 104a-104n, a foreign exchange office (FXO) server 140, example user interfaces that can include a touch screen display 106, a bar code scanners/keyboard/mouse (112), and a remote tablet 108. Each of the plurality of test systems 104a-104n may be associated with at least one Faraday cage.

Each Faraday cage is, in turn, associated with several physical test slots, of which in each can be installed a device (e.g., wireless router) to be tested. Each installed device in the various physical slots may be referred to as a device under test (DUT). For ease of explanation and to avoid overcrowding the drawing of FIG. 1, FIG. 1 shows only one of the Faraday cages 114. Each Faraday cage 114 is associated with a cable modem termination system (CMTS) 120, a Multimedia over Coax Alliance (MOCA) Local Area Network (LAN) harness 122 and a radio frequency (RF) splitter 124. According to certain implementations, MOCA LAN harness 122 is connected to RF splitter 124 via RF cable 126b and CMTS 120 is connected to RF splitter 124 via RF cable 126a. RF splitter 124 is connected to Faraday cage 114 via COAX cable 126c. Faraday cage 114 has Ethernet connections 116 to its associated test system. MOCA LAN harness 122 also has an Ethernet connection 129 to the associated test system. CMTS 120 also has an Ethernet connection 128 to the FXO server via local router 142. Test controller 102, test systems 104a-104n, and FXO server have a LAN 130 connection to a firewall/gateway/router 110, which in turn is connected to a Wide Area Network (WAN) 132. A user can optionally use remote wireless tablet 108 to interface with test station 100 remotely through a wireless communication 134 to firewall/gateway/router 110. Further FXO server 140 is connected to Faraday cage 114 via telephony cable 144, according to certain implementations.

According to certain implementations, the firewall isolates the test framework of the testing system.

According to certain implementations, the CMTS is used for testing Data Over Cable Service Interface Specification (DOCSIS) device registration and data throughput.

According to certain implementations, the testing system comprises at least one test station 100. According to certain implementations, each test station 100 includes a plurality of Faraday cages wherein each Faraday cage includes a plurality of physical slots for testing devices. As a non-limiting example, a subset of the plurality of physical slots is associated with a corresponding test system. As a non-limiting example, a test station may have four test systems, each of which is associated with a Faraday cage, which in turn is associated with a set of four physical slots of the plurality of physical slots. The implementations are not restricted to four test systems. Further, implementations are not restricted to one Faraday cage per test system, nor are the implementations restricted to four physical slots per Faraday cage. The number of test systems, Faraday cages, and physical slots may vary from implementation to implementation. According to certain implementations, each test system includes virtualization containers that act as probes for testing devices installed in the physical slots in the test station.

According to certain implementations, several wireless devices can be tested simultaneously in the test station.

According to certain implementations, the user interface can communicate through web sockets with the test system. Such communication is in real-time, bi-directional and asynchronous so that the user can control and monitor the testing of multiple devices simultaneously and independently of each other using the same universal testing system.

According to certain implementations, the testing system is capable of testing a set of similar types of devices or a set of disparate devices.

According to certain implementations, test controller 102 is a computer subsystem that manages the user interfaces of the testing system. Thus, at least the following devices are connected to test controller 102: touch screen display 106, and bar code scanners/keyboard/mouse 112.

According to certain implementations, touch screen display 106 is a touch-enabled screen that senses user/operator inputs for a given DUT. For example, each DUT is represented on the touch screen display as a window that includes test related information such as test progress and test results. As another non-limiting example, a user/operator can use touch screen display 106 to input Light Emitting Diode (LED) status (is the LED lit or not lit) when the user/operator is prompted for inputs as part of the testing procedure of a given DUT.

According to certain implementations, one or more the bar code scanners 112 can be used to read DUT information such as serial number of the DUT, and default Wi-Fi passwords associated with the given DUT. Such information is needed to conduct testing on the given DUT.

According to certain implementations, test controller 102 includes an Ethernet interface to connect to the plurality of test systems 104a-104n. Test controller 102 communicates with the plurality of test systems 104a-104n using such an Ethernet interface to conduct tests on the various DUTs that are installed in test station 100.

According to certain implementations, keyboard/mouse 112 are part of test controller 102 and can be used by the user/operator to input data needed to run the tests on the various DUTs installed in test station 100.

According to certain implementations, each test system of the plurality of test systems 104a-104n provides interfaces (hardware ports) needed to conduct one or more tests on the DUTs. Depending on the type of test, a given test may need a single port or multiple ports as part of the test infrastructure. According to certain implementations, such ports are controlled by virtualization containers at the test systems.

According to certain implementations, a given test system includes the following devices: PCI/PCI Express/Mini PCI Express slots, Ethernet connectivity hardware and software.

According to certain implementations, the PCI/PCI Express/Mini PCI Express slots allow Wi-Fi cards to be installed on a given test system to provide Wi-Fi connectivity to perform Wi-Fi tests on the DUTs. Such slots can also be used to install Ethernet cards to provide Ethernet ports to perform tests on the DUTs. According to certain implementations, such PCI/PCI Express/Mini PCI Express slots can host a set of ports that can be associated with a corresponding set of virtualization containers on the test systems. Such virtualization containers are used for testing various features on the DUTs such as Wi-Fi, LAN, WAN, or MOCA interfaces of a given DUT.

According to certain implementations, the voice port associated with the FXO card is used for testing Voice over IP (VoIP) connection and functions.

According to certain implementations, Ethernet connectivity hardware and software are provided to connect the test controller computer to the plurality of test systems for controlling the plurality of test systems.

According to certain implementations, the test systems run test scripts to perform one or more tests such as: 1) testing Ethernet data throughput speeds, 2) testing Wi-Fi throughput speeds, 3) testing MOCA throughput speeds, 4) testing VOIP connections and functions, 5) testing Multiple-Input, Multiple-Output (MIMO) antenna technology, according to certain implementations. According to certain implementations, the test systems use virtualization containers to run such tests.

Figure 2A:
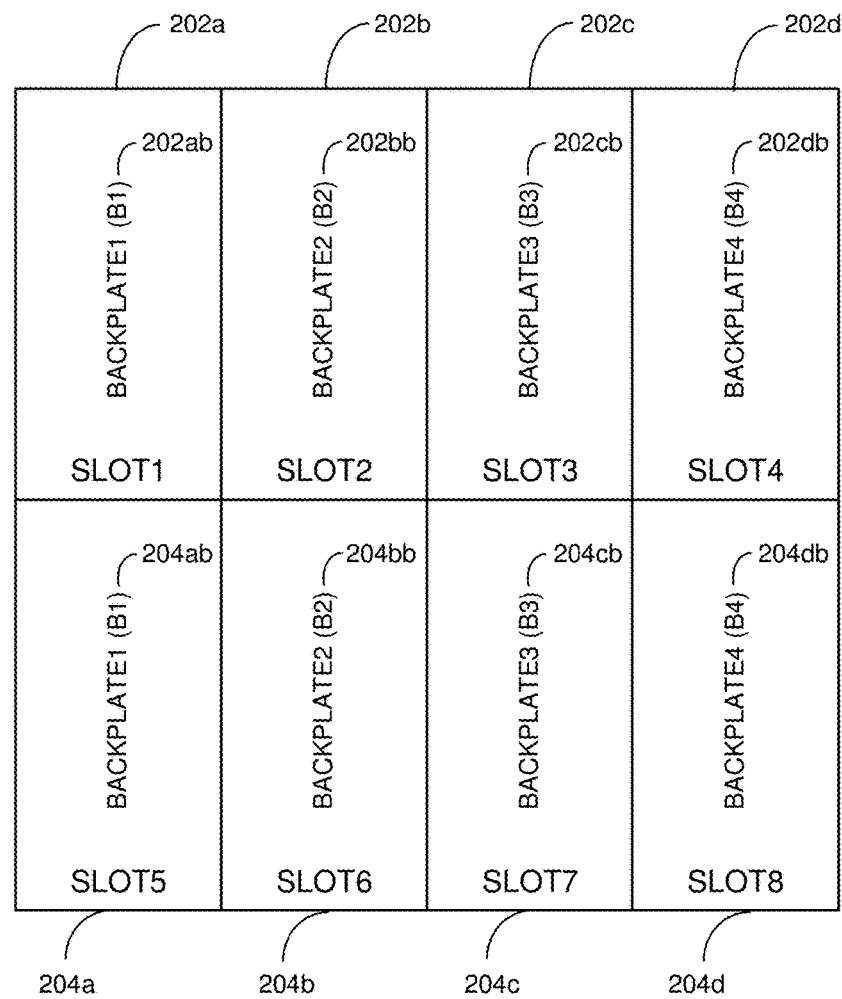
FIG. 2A and FIG. 2B are high-level schematics of a front view of a set of Faraday cages of a universal testing system, according to certain implementations.
Figure 2B:
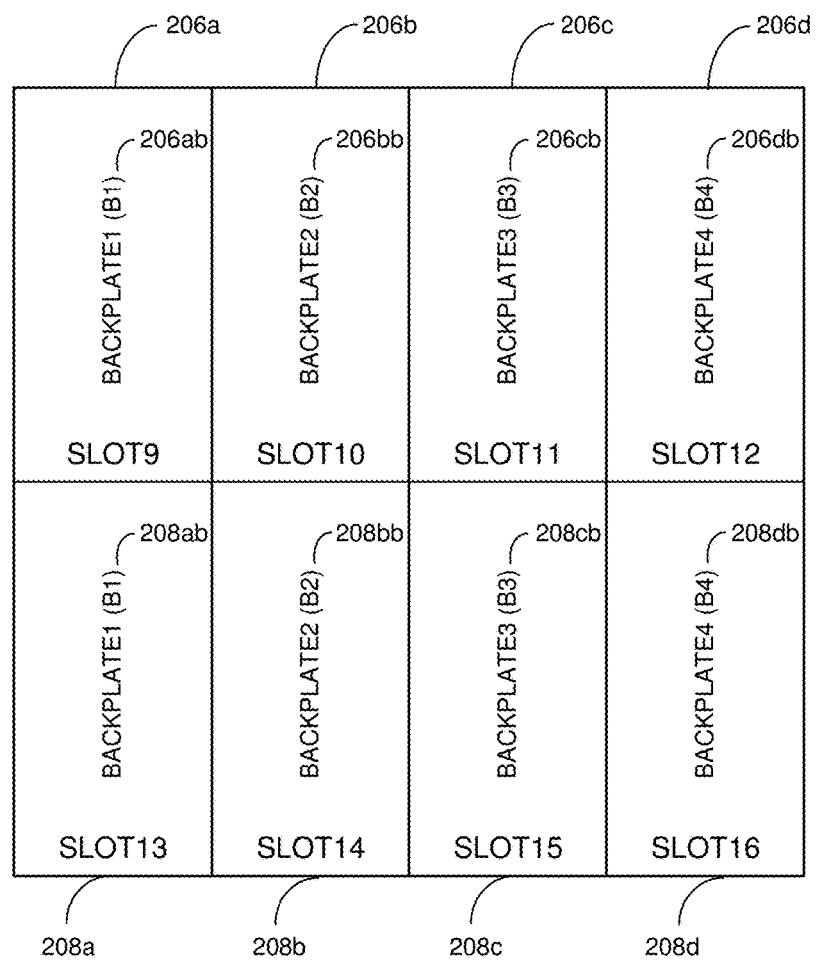

FIG. 2A and FIG. 2B are high-level schematics of front views of a set of Faraday cages of a universal testing system, according to certain implementations. FIG. 2A shows two Faraday cages (202, 204) of the plurality of Faraday cages of the universal testing system according to certain implementations. Faraday cage 202 comprises a number of physical slots, such as slots 202a, 202b, 202c, 202d. Each slot of Faraday cage 202 has a backplate (202ab, 202bb, 202cd, 202db). Faraday cage 204 comprises a number of physical slots, such as slots 204a, 204b, 204c, 204d. Each slot of Faraday cage 204 has a backplate (204ab, 204bb, 204cd, 204db). Backplates are also known as backplanes.

Similarly, FIG. 2B shows two Faraday cages (206, 208) of the plurality of Faraday cages of the universal testing system, according to certain implementations. Faraday cage 206 comprises a number of physical slots, such as slots 206a, 206b, 206c, 206d. Each slot of Faraday cage 206 has a backplate (206ab, 206bb, 206cd, 206db). Faraday cage 208 comprises a number of physical slots, such as slots 208a, 208b, 208c, 208d. Each slot of Faraday cage 204 has a backplate (208ab, 208bb, 208cd, 208db). Sample backplates are described herein with reference to FIG. 3 herein.

Figure 3:
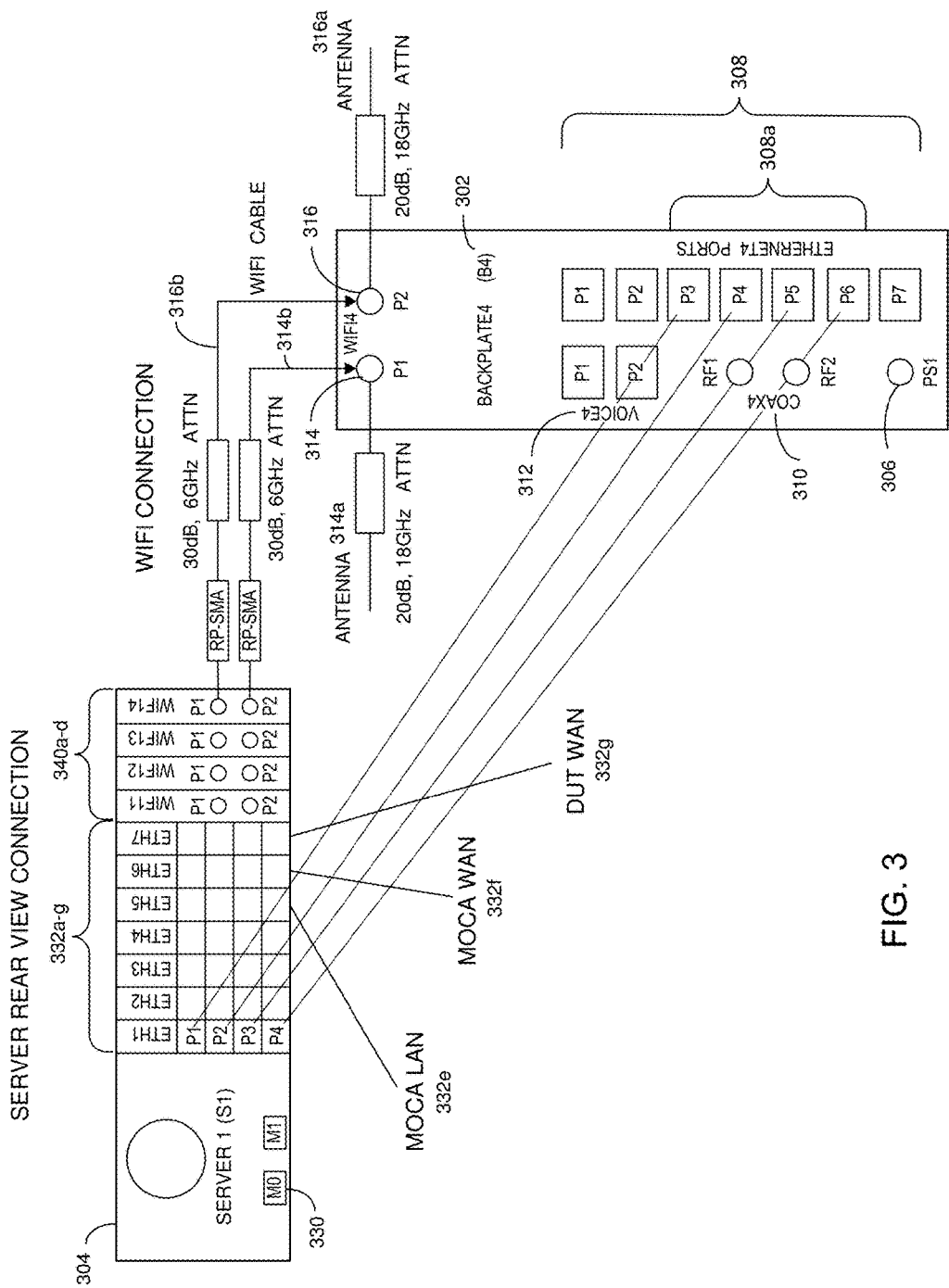
FIG. 3 is a high level schematic that illustrates the connectivity features of backplates of physical slots to test systems, according to certain implementations.

FIG. 3 is a high-level schematic that illustrates the connectivity features of backplates of physical slots relative to test systems, according to certain implementations. For ease of explanation, FIG. 3 shows the connectivity of one backplate of the plurality of backplates to one test system of the plurality of test systems in the universal testing system, according to certain implementations. As previously described, there are a plurality of test systems and a plurality of slots (and corresponding backplates) per test system, according to certain implementations.

FIG. 3 shows a backplate 302 associated with a given slot that is, in turn, associated with a test system 304 in the universal testing system. Backplate 302 includes but is not limited to a power supply port 306, a set of ports 308, a subset of which are Ethernet ports 308a, a set of coaxial ports 310, a set of voice ports 312, and a set of Wi-Fi ports (314, 316). Server 304 includes but is not limited to a master Internet port 330, a set of Ethernet card ports 332a-g, of which 4 ports (332a-d) are Ethernet LAN ports, one Ethernet MOCA LAN port 332e, one Ethernet MOCA WAN port 332f, and one DUT WAN port 332g. Test system 304 also includes a set of Wi-Fi card ports 340a-d. One or more of the Wi-Fi card ports 340a-d can be associated with a Wi-Fi virtualization container on test system 304 for use in Wi-Fi tests of the DUT, according to certain implementations.

According to certain implementations, port P3 of Ethernet ports 308a is associated with port P1 of Ethernet card ports 332a. Similarly, port P4 of Ethernet ports 308a is associated with port P2 of Ethernet card ports 332a. Port P5 of Ethernet ports 308a is associated with port P3 of Ethernet card ports 332a. Port P6 of Ethernet ports 308a is associated with port P4 of Ethernet card ports 332a.

According to certain implementations, Wi-Fi port 314 is associated with an antenna 314a and is also associated with port P2 of Wi-Fi card port 340d via Wi-Fi cable 314b, for example. Wi-Fi port 316 is associated with an antenna 316a and is also associated with port P1 of Wi-Fi card port 340d via Wi-Fi cable 316b.

According to certain implementations, a given DUT that is installed in a given slot is connected via coaxial ports 310 to the MOCA WAN Ethernet port (332f) and MOCA LAN Ethernet port (332e) via a corresponding MOCA WAN harness and a MOCA LAN harness, described in greater detail below.

Figure 4:
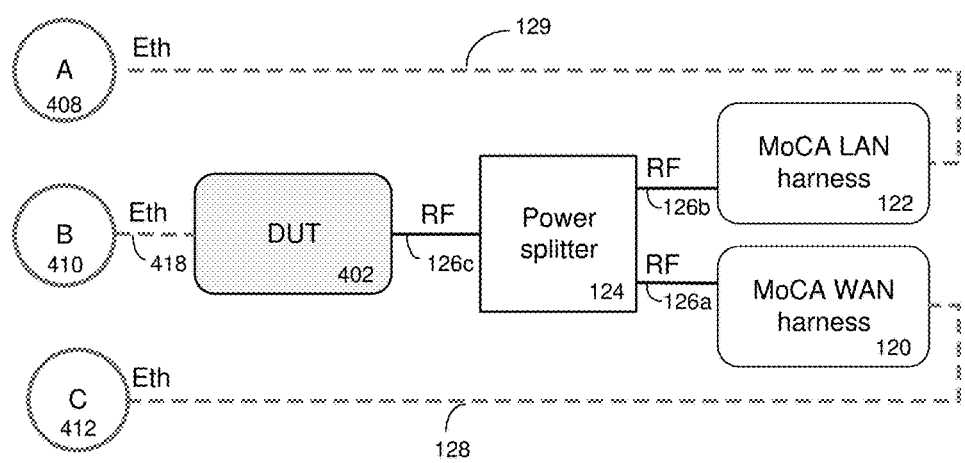
FIG. 4 is a high-level schematic of connectivity of a Device Under Test (DUT) with a Multimedia over Coax Alliance (MOCA) Local Area Network (LAN) harness and a MOCA Wide Area Network (WAN) harness, according to certain implementations.

FIG. 4 is a high-level schematic of connectivity of a given DUT (installed in a given slot) to a MOCA LAN harness and a MOCA WAN harness, according to certain implementations. MOCA WAN harness 120 and MOCA LAN harness 122 are used for testing the MOCA WAN interface and the MOCA LAN interface, respectively, of DUT 402. MOCA WAN harness 120 and MOCA LAN harness 122 are connected to a power splitter 124 via RF cable 126a and RF cable 126b, respectively, according to certain implementations. Power splitter 124 connects the MOCA LAN and MOCA WAN to DUT 402 via RF cable 126c. According to certain implementations, MOCA WAN harness 120 is also connected via Ethernet cable 128 to an Ethernet port 412 of a test system, where such an Ethernet port 412 is associated with a virtualization container on the test system. Similarly, MOCA LAN harness 122 is also connected via Ethernet cable 129 to an Ethernet port 408 of a test system, where such an Ethernet port 408 is associated with a virtualization container on the test system, according to certain implementations. Further, DUT 402 is also connected to the test system via RF cable 418 to an Ethernet port 410 of the server that is associated with a virtualization container.

For example, test information (and/or other related information) can flow from Ethernet port 410 (and associated virtualization container) to DUT 402 and then to the MOCA LAN interface of MOCA LAN harness 122 and then to Ethernet port 408 (and associated virtualization container). Test information (and/or other related information) can also flow from Ethernet port 408 (and associated virtualization container) to the MOCA LAN interface of MOCA LAN harness 122, and then to DUT 402, and then to Ethernet port 410 (and associated virtualization container).

Similarly, test information (and other related information) can flow from Ethernet port 410 (and associated virtualization container) to DUT 402 and then to the MOCA WAN interface of MOCA WAN harness 120 and then to Ethernet port 412 (and associated virtualization container). Test information (and/or other related information) can also flow from Ethernet port 412 (and associated virtualization container) to the MOCA WAN interface of MOCA WAN harness 120, and then to DUT 402, and then to Ethernet port 410 (and associated virtualization container).

Figure 5:
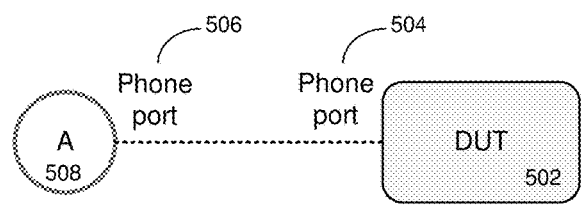
FIG. 5 is a high-level schematic that illustrates a Foreign Exchange Office (FXO) test hardware architecture, according to certain implementations.

FIG. 5 is a high-level schematic that illustrates an FXO test architecture, according to certain implementations. FIG. 5 shows a DUT 502, a phone port 504 of DUT 502, a phone port 506 at a given test system. An FXO card is installed at the given test system. The FXO card provides the phone port 506 that can be connected to phone port 504 of DUT 502. Further, phone port 506 is also associated with a virtualization container 508, according to certain implementations. Such a virtualization container can make phone calls to the DUT 502. According to certain implementations, DUT 502 may be placed inside a Faraday cage of the testing system.

Figure 6:
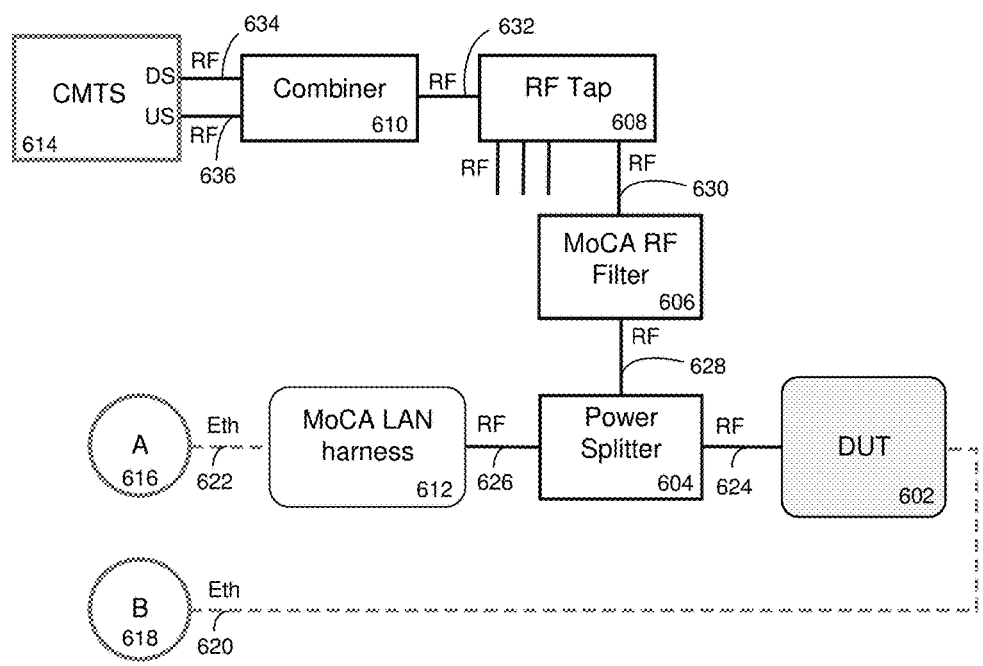
FIG. 6 is high-level schematic that illustrates a Cable Modem Termination System (CMTS) test architecture associated with the FXO test architecture, according to certain implementations.

FIG. 6 is high-level schematic that illustrates a CMTS test harness associated with the FXO test architecture, according to certain implementations. FIG. 6 shows DUT 602, power splitter 604, MOCA RF filter 606, RF tap 608, combiner 610, MOCA LAN harness 612, CMTS 614, virtualization container associated with Ethernet port 616 and virtualization container associated with Ethernet port 618. CMTS 614 is connected to combiner 610 via RF cable (636, 634). Combiner 610 is connected to RF tap 608 via RF cable 632. RF tap 608 is connected to MOCA RF filter 606 via RF cable 630. MOCA RF filter 606 is connected to power splitter 604 via RF cable 628. Ethernet port 616 on a given test system is connected to MOCA LAN harness 612 via Ethernet cable 622. MOCA LAN harness 612 is connected to power splitter 604 via RF cable 626. Power splitter 604 is connected to DUT 602 via RF cable 624. DUT 602 is connected to Ethernet port 618 on the test system via Ethernet cable 620.

According to certain implementations, the CMTS test harness enables the DUT 602 to respond to test phone calls from the MOCA interface and which test phone calls terminate at the phone port of DUT 602. According to certain implementations, when the DUT 602 is powered up, the CMTS 614 is configured to provide IP addresses for the session initiation protocol (SIP) server running on the DUT 602.

As a non-limiting example, a telephone call path flows from Ethernet port 616 on the test system to MOCA LAN harness 612 via Ethernet cable 622 and then to power splitter 604 via RF cable 626, and then to DUT 602 via RF cable 624, and then to Ethernet port 618 on the test system via Ethernet cable 620.

Figure 7A:
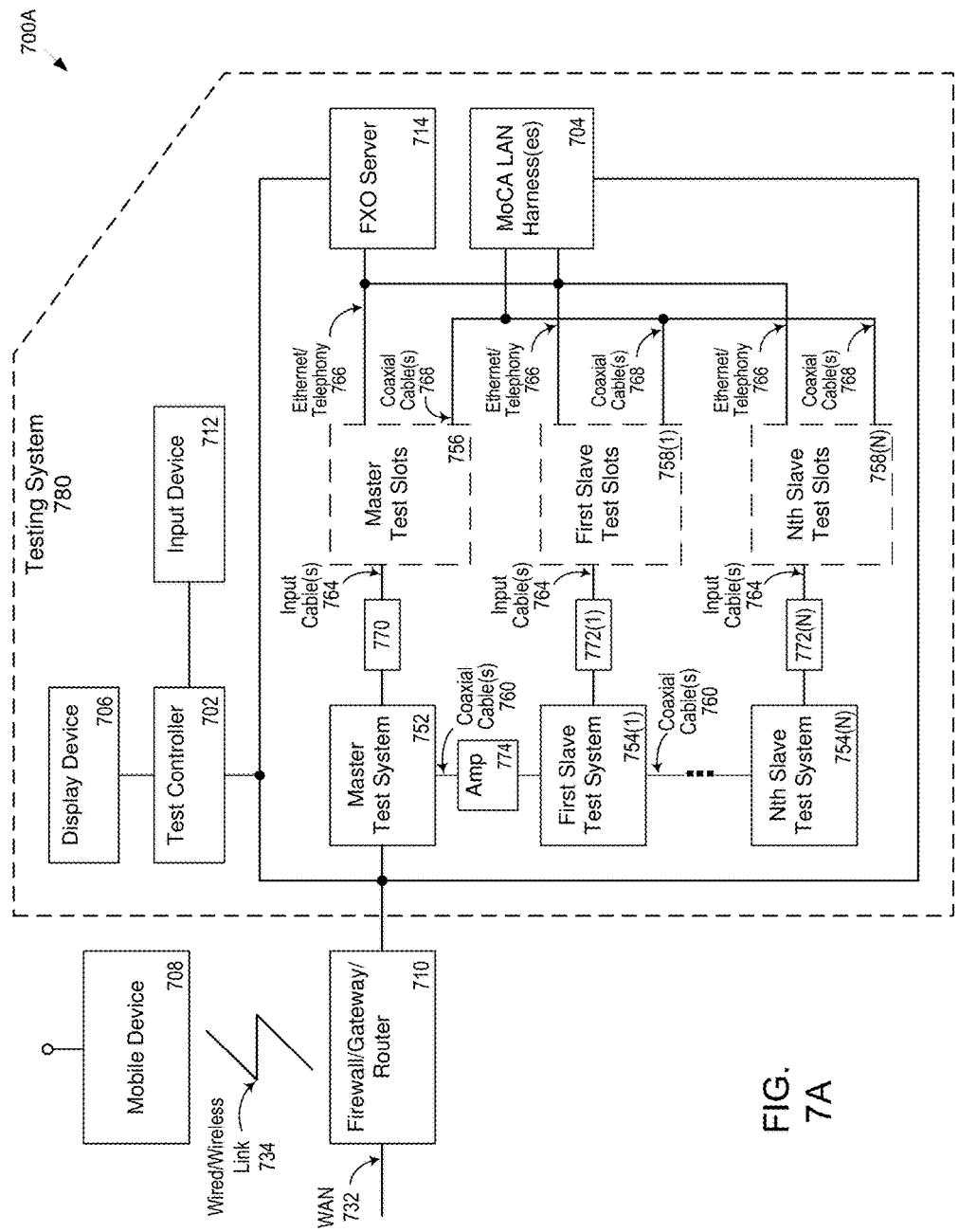
FIG. 7A illustrates a high-level hardware architecture of a testing network for cable modem tests using a master test system and a plurality of slave test systems, according to some implementations.

FIG. 7A illustrates a high-level hardware architecture of a testing network 700A for cable modem tests using a master test system 752 and a plurality of slave test systems 754 (1-N), according to some implementations. Although the testing network 700A is being described for testing cable modems, the testing network 700A can be used to test other electronic devices, such as wireless routers, bridges, etc. The testing network 700A includes a firewall/gateway/router 710, coupled to a WAN 732, coupled via a wired/wireless connection to a mobile device 708, and coupled to a testing system 780. The testing system 780 includes a test controller 702, a MoCA LAN harness(es) 704, an FXO server 714, and a master test system 752, each coupled via a LAN 730 to the firewall/gateway/router 710. The testing system 780 further includes a display device 706 and an input device 712, each coupled to the test controller 702. The testing system 780 further includes test systems, including the master test system 752, slave test systems 754 (shown as first slave test systems 754(1) through Nth slave test systems 754(N)). The testing system 780 further includes test slots, including master test slots 756 and slave test slots 758 (shown as first slave test slots 758(1) through Nth slave test slots 758(N)), each slot configured to receive a DUT.

The testing network 700A further includes one or more communication channels to couple components to one another, including but not limited to: a LAN 730, a WAN 732, a wireless link 734, coaxial cables 760, Ethernet/telephony cables 766, and/or coaxial cables 768. In various implementations, the LAN 730 couple the firewall/gateway/router 710, the test controller 702, the FXO server 714, and the MoCA LAN harness 704 to one another and/or to other components not shown. The WAN 732 couples the firewall/gateway/router 710 to one or more components that provide data to the firewall/gateway/router 710. The wired/wireless link 734 couples the mobile device 708 to the firewall/gateway/router 710. The Ethernet/telephony cables 766 couple the FXO server 714 to the master test slots 756 and the slave test slots 758. The coaxial cables 768 couple the MoCA LAN harness 704 to the master test slots 756 and the slave test slots 758.

Figure 9:
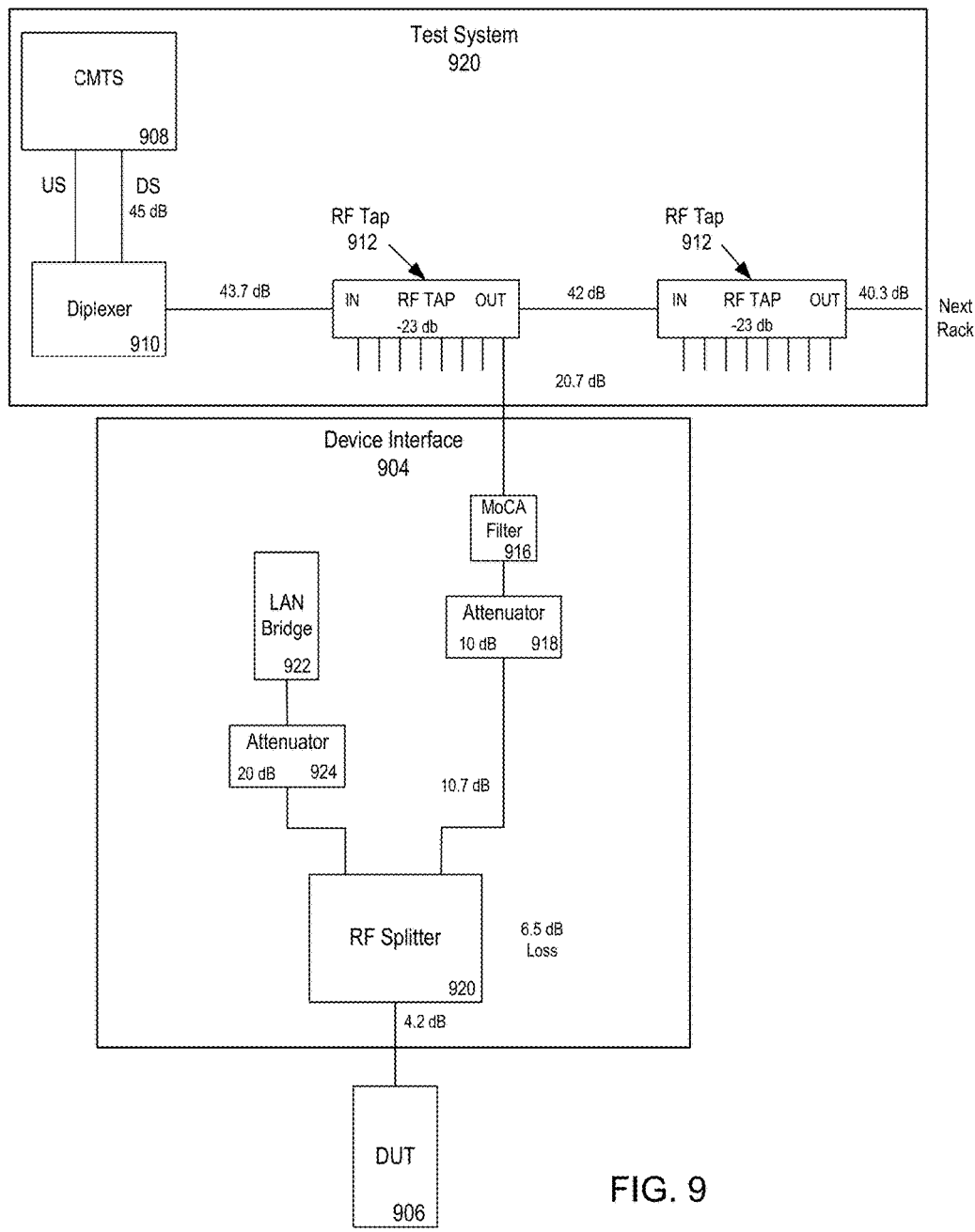
FIG. 9 illustrates a hardware architecture that includes a device interface used to connect a test system to a DUT, according to some implementations.

The testing network 700A may include one or more interfaces that couple the test systems 752, 754 to DUTs in test slots 756, 758, and/or couple test systems 752, 754 to other test systems 752, 754. In some implementations, the testing network 700A may include a master-to-device interface 770 configured to couple the master test system 752 to DUTs in the master test slots 756. The master-to-device interface 770 may include one or more circuits configured to accommodate attenuation of signals between the master test system 752 and DUTs in the master test slots 756. In some implementations, the testing network 700A may include a slave-to-device interface 772 configured to couple the slave test systems 754 to DUTs in the slave test slots 758. The slave-to-device interface 772 may be configured to accommodate attenuation of signals between the slave test systems 754 and DUTs in the slave test slots 758. FIG. 9 illustrates a hardware architecture 900 that includes a device interface 904 that can be used as the basis of the master-to-device interface 770 and/or the slave-to-device interface 772.

Figure 18:
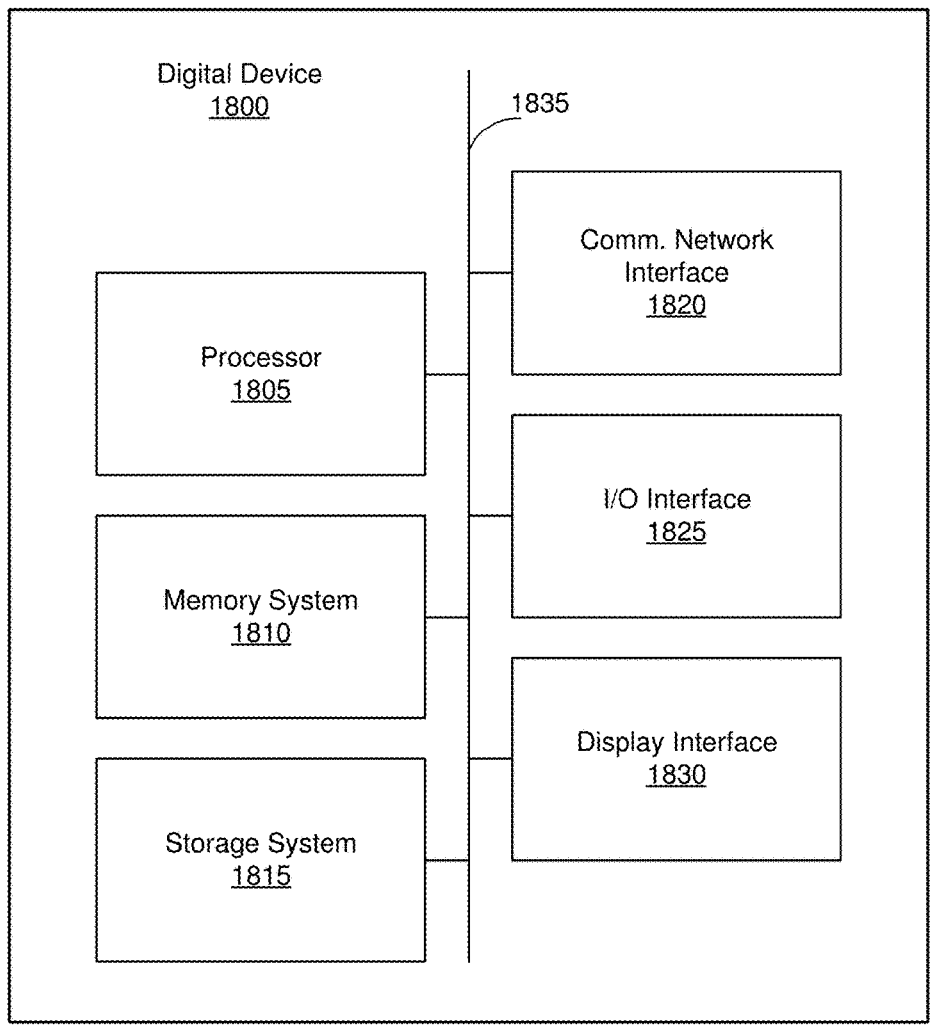
FIG. 18 illustrates a block diagram of a digital device, according to some implementations.

The test controller 702 may include a digital device configured to allow users to implement and/or otherwise control test processes executed by the master test system 752 and/or the slave test systems 754 on DUTs in the master test slots 756 and/or in the slave test slots 758. A "digital device," as used herein, may refer to any electronic device having a memory and a processor. An example of a digital device is shown in FIG. 18. In various implementations, the test controller 702 may process instructions to test DUTs in the master test slots 756 and the slave test slots 758. More particularly, the test controller 702 may receive from the input device 712 and/or a touchscreen display on the display device 706 identifiers and/or properties of DUTs housed in test slots. For example, the test controller 702 may receive from the input device 712 names, bar codes, stock keeping unit (SKU) numbers, or other identifiers that identify specific models, makes, etc. of DUTs that are subject to test protocols. In some embodiments, the test controller 702 may receive information related to specific components (ports, circuits, etc.) of DUTs that are to be tested, and/or identifiers of specific test protocols/sequences of tests that are to be performed on DUTs in the master test slots 756 and/or the slave test slots 758. The test controller 702 may control the display device 706 to display identifiers, properties, and/or other information of DUTs. The test controller 702 may control the display device 706 to display results of tests performed on DUTs in the master test slots 756 and/or the slave test slots 758. The test controller 702 may be configured similarly to the test controller 102, shown in FIG. 1 and discussed further herein.

The test controller 702 may control the display device 706 to display test data to a user. "Test data," as used herein, may refer to any information relevant to testing DUTs in the master test slots 756 and/or the slave test slots 758. The display device 706 may comprise a touchscreen display, and thus may incorporate an input device 712 therein. The touchscreen display may facilitate display user interface elements (menus, radio buttons, etc.) that a tester can use to select specific DUTs and/or specific sequences of tests on DUTs. In various implementations, the display device 706 may be configured similarly to the touchscreen display 106, shown in FIG. 1 and/or other figures and discussed further herein. It is noted that in various implementations, the display device 706 may include only some of the components of the touchscreen display 106.

The input device 712 may comprise a digital device configured to receive and process user input. The input device 712 may include scanners, keyboards, mice, touch screens, trackpads, and/or other input devices. The input device 712 may include one or more bar code scanners configured to process bar codes or other encoded data. In various implementations, the input device 712 may be configured similarly to the bar code scanners/keyboard/mouse 112, shown in FIG. 1 and/or other figures and discussed further herein.

The mobile device 708 may comprise a digital device having some or all of the functionalities of the test controller 702, the display device 706, and the input device 712. The mobile device 708 may comprise one or more of a mobile phone, a tablet computing device, a laptop computer, and a desktop computer. The mobile device 708 may be coupled to the firewall/gateway/router 710 over the wireless link 734. In various implementations, the mobile device 708 may be configured similarly to the tablet 108.

The FXO server 714 may comprise a digital device configured to provide voice over internet protocol (VOIP) and/or other telephony services to other devices. In various implementations, the FXO server 714 may provide voice data over the Ethernet/telephony cable(s) 766 to test DUTs in the master test slot 756 and/or the slave test slots 758. The FXO server 714 may be configured similarly to the FXO server 140, shown in FIG. 1 and/or other figures and discussed further herein.

The MoCA LAN harness(es) 704 may comprise one or more digital devices configured to receive and/or provide data over the Ethernet/telephony cable(s) 766 and/or the coaxial cable(s) 768 to test DUTs in the master test slot 756 and/or the slave test slots 758. The MoCA LAN harness(es) 704 may include some or all of the components of the MOCA LAN harness 122, shown in FIG. 1 and/or other figures and discussed further herein. The MoCA LAN harness(es) 704 may include other components.

The master test system 752 may comprise a digital device configured to support tests of DUTs in the master test slots 756 and/or the slave test slots 758. The master test system 752 may receive from the test controller 702 identifiers of specific DUTs in the master test slots 756 and/or the slave test slots 758. In some implementations, the identifiers may correspond to bar codes, model numbers, serial numbers, or other identifiers of DUTs scanned in/obtained/etc. by the input device 712. The master test system 752 may further receive identifiers of specific tests (e.g., specific components to test, specific test protocols, etc.) to be performed on DUTs in the master test slots 756 and/or the slave test slots 758.

In some implementations, the master test system 752 implements one or more control servers that control tests of DUTs in the master test slots 756 and/or the slave test slots 758. Some control servers in the master test system 752 may facilitate tests of DUTs in the master test slots 756, while other control servers in the master test system 752 may facilitate tests of DUTs in the slave test slots 758. As examples, the control servers in the master test system 752 may include control servers for: testing provisioning/SIP features of DUTs in the master test slots 756 and DUTs in the slave test slots 758, for providing resources for testing DUTs in the master test slots 756 and DUTs in the slave test slots 758, for testing call management service features of DUTs in the master test slots 756 and DUTs in the slave test slots 758, and/or for testing DOCSIS/WAN features of DUTs in the master test slots 756 and DUTs in the slave test slots 758. The control servers in the master test system 752 may further include functionalities of a cable modem termination system (e.g., features of the CMTS 120 shown in FIG. 1) for testing those features of DUTs in the master test slots 756 and DUTs in the slave test slots 758.

In some implementations, the control servers in the master test system 752 may manage probes used to test ports and/or other components of DUTs in the master test slots 756. A "probe," as used herein, may refer to hardware, firmware, software, or some combination thereof that is used to virtualize an interface with a port or other component of a DUT. Probes may, but need not, include software servers that represent physical properties (voltages, currents, etc.) of an interface with a port or other component of a DUT.

Figure 10:
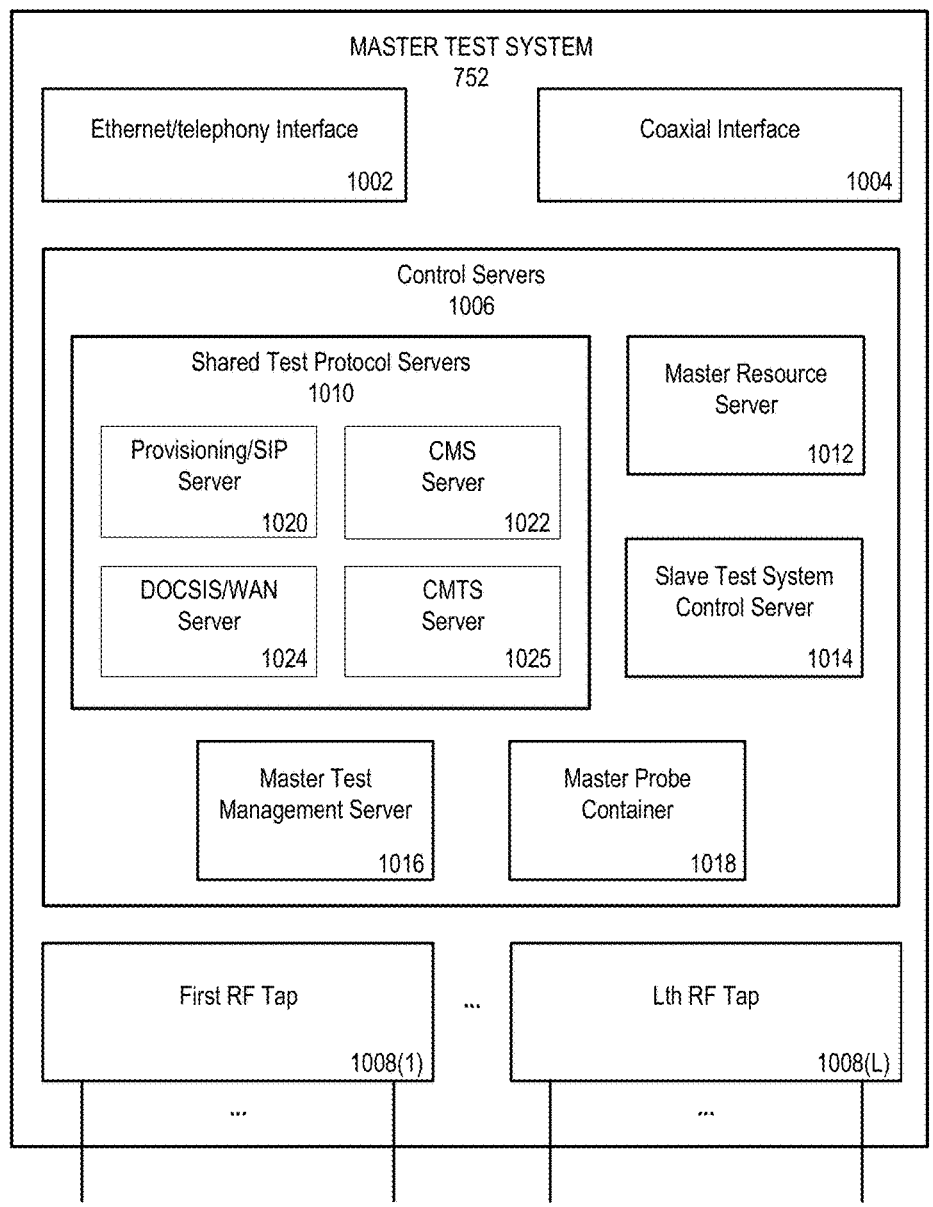
FIG. 10 illustrates a master test system, according to some implementations.
Figure 11:
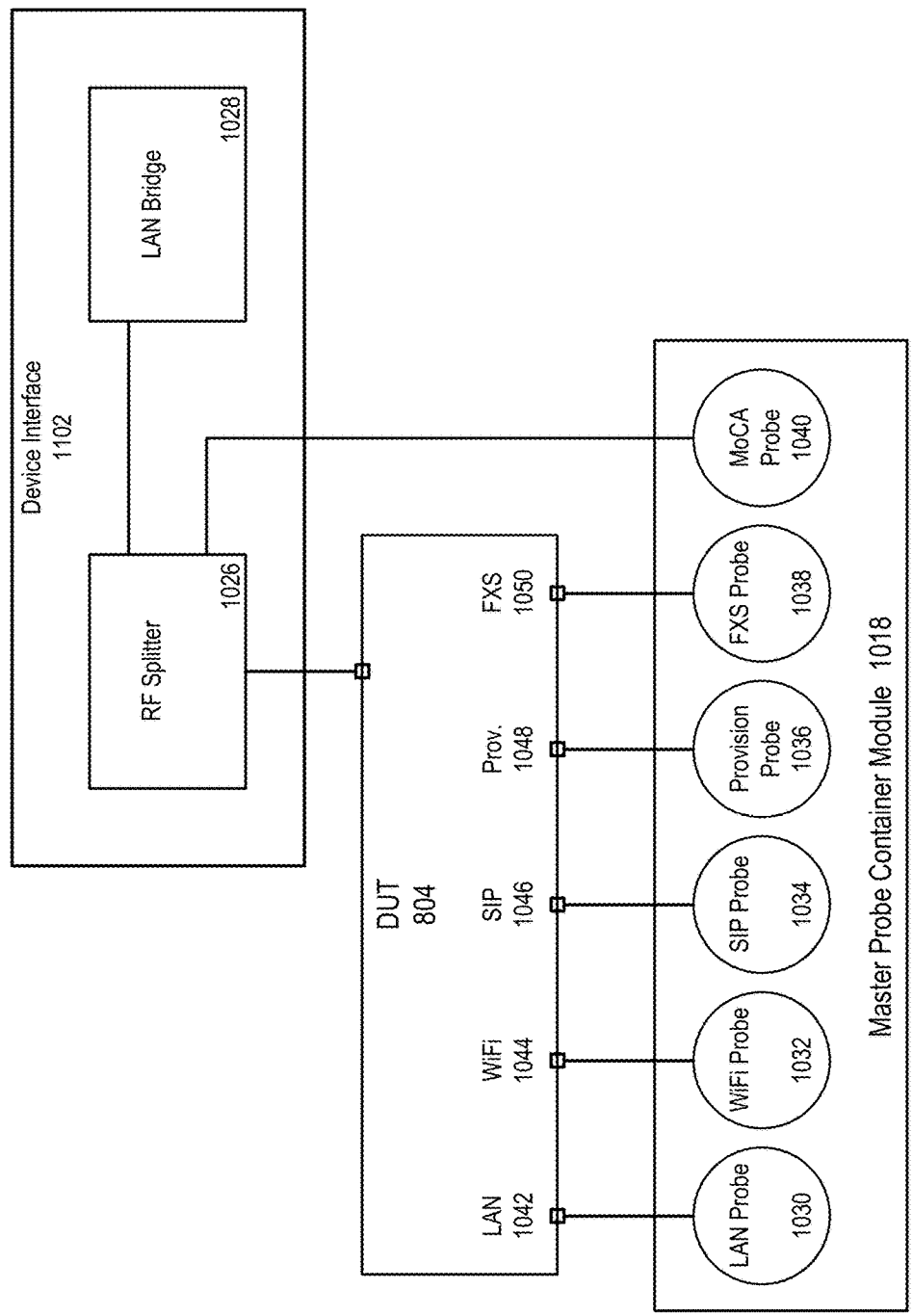
FIG. 11 illustrates a master test system coupled to a device interface and a DUT, according to some implementations.

The control servers in the master test system 752 may allow the master test system 752 to provide to the slave test systems 754 instructions to perform tests on DUTs in the slave test slots 758. The control servers in the master test system 752 may allow the master test system 752 to provide instructions to control the slave test systems 754. FIG. 10 and FIG. 11 show examples of the master test system 752 in greater detail.

The slave test systems 754 may comprise a digital device configured to support tests of DUTs in the slave test slots 758. The slave test systems 754 may receive from the test controller 702 identifiers of specific DUTs in the slave test slots 758. The identifiers may correspond to codes, model numbers, serial numbers or other identifiers of DUTs scanned in/obtained/etc. by the input device 712. The slave server 754 may further receive identifiers of specific tests (e.g., specific components to test, specific test protocols, etc.) to be performed on DUTs in the slave test slots 758.

The slave test systems 754 may implement one or more control servers that control tests of DUTS in the slave test slots 758. Examples of control servers in the slave test systems 754 include: control servers for processing instructions from the master test system 752, control servers for providing resources for testing DUTs in slave test slots 758, and control servers for managing probe containers used to test ports and/or other components of DUTs in the slave test slots 758. In various implementations, the slave test systems 754 receives from the master test system 752 instructions to perform the following tests on DUTs in the slave test slots 758: provisioning/SIP tests, CMS tests, DOCSIS/WAN tests, and/or tests using a cable modem termination system (CMTS) incorporated in the master test system 752.

In various implementations, the slave test systems 754 are coupled to the master test system 752 and/or each other over the coaxial cable(s) 760. Amplifier(s) 774 may be placed between the master test system 752 and the slave test systems 754, and/or between different slave test systems 754 to address attenuation caused by the coaxial connections and/or components between those systems.

It will be appreciated that the master test system 752, the master-to-device interface 770, and the master test slots 756 may be mounted onto a single rack. Similarly, each slave test system 754, slave-to-device interface 772, and slave test slots 758 may be mounted on a single rack. As will be discussed in detail below, the master test system 752 may include components (e.g., hardware, software and/or firmware) for controlling the slave test systems and/or for controlling the DUTs in the slave test slots 758, so that each slave test system 754 need not have a copy of those shareable components. The shareable components to be managed by the master test system 752 may be those components capable of supporting the work needed to test the DUTs of the master test system 752 and the slave test system 754. That is, if a shareable component can support four slaves, then the shareable component may be omitted from the next four slave test system 754. Similarly, if a master component cannot support any DUTs other than those in the master test slots 756, then a separate copy of the component may need to be included in each slave test system 754.

As noted above, to address power losses, an amplifier 774 may need to be included between each rack or between each set of n racks (e.g., 4 or 5). The number of racks between each amplifier 774 may be based on the amount of signal degradation and the size of the amplifier. The number of racks between each amplifier 774 need not be a constant. The size of an amplifier 774 may be based on signal strength, signal degradation across one or more racks that precede it, the number and size of amplifiers 774 that precede it, and/or the power needed at the DUTs.

The master test slots 756 may comprise a set of electromagnetically shielded slots configured to house a first group of DUTs. In some implementations, the master test slots 756 include openings for wires and/or other computer readable media used to couple the master test system 752, the FXO server 714, and the MoCA LAN harness(es) 704 to the first group of DUTs. The master test slots 756 may comprise Faraday cages that electromagnetically shield the first group of DUTs from each other. The master test slots 756 may include any number of test slots, e.g., 8 or 16. In some implementations, the master test slots 756 may be configured similarly to the Faraday cages shown in FIG. 2A and FIG. 2B, and discussed further herein. The master test slots 756 may be configured similarly to the test slots 800 shown in FIG. 8.

The slave test slots 758 may comprise a set of electromagnetically shielded slots configured to house second group(s) of DUTs. In some implementations, the slave test slots 758 include openings for wires and/or other computer readable media used to couple the master test system 752, the FXO server 714, and the MoCA LAN harness(es) 704 to the second group(s) of DUTs. The slave test slots 758 may comprise Faraday cages that electromagnetically shield the second group(s) of DUTs from each other. The slave test slots 758 may include any number of test slots, e.g., 8 or 16. In some implementations, the slave test slots 758 may be configured similarly to the Faraday cages shown in FIG. 2A and FIG. 2B, and discussed further herein. The slave test slots 758 may be configured similarly to the test slots 800 shown in FIG. 8.

In various implementations, the testing network 700A operates to facilitate tests of DUTs in the master test slots 756 and/or the slave tests slots 758 based on instructions from the test controller 702, the master test system 752, and/or the slave test systems 754. As an example of operation, test personnel (e.g., personnel responsible for testing DUTs) may load a first group of DUTs in the master test slots 756, and second group(s) of DUTs in the slave test slots 758. Test personnel may insert DUTs into relevant Faraday cages and/or electromagnetically shielded areas of test slots. In various implementations, test personnel provide the test controller 702 with identifiers of the DUTs inserted into test slots. In some embodiments, the test personnel may scan bar codes of DUTs using the input device, manually enter into the input device 712 identifiers of DUTs inserted into test slots, etc. In some implementations, the test controller 702 may provide data to the display device 706 to display identifiers and/or other relevant information of DUTs that are inserted into test slots. Test personnel may couple input cable(s) 762, Ethernet/telephony cables 766 and/or coaxial cable(s) 768 to DUTs in the master and slave test slots 756,758.

Once DUTs have been inserted into test slots 756, 758 and coupled to the FXO server 714, the MoCA LAN harness(es) 704, etc., the testing network 700A may operate to allow the test personnel to initiate testing of the DUTs. In various implementations, the test controller 702 may provide to the master test system 752 instructions to initiate testing. The master test system 752 may provide information relevant to provisioning/SIP tests, CMS tests, DOCSIS/WAN tests, and/or tests that originate at a CMTS to DUTs in the master test slots 756 and/or DUTs in the slave test slots 758. The master test system 752 may configure the DUTs in the master test slots 756 and/or slave test slots 758 to provide to the FXO server 714 telephony data over the Ethernet/telephony cable(s) 766. The master test system 752 may configure the DUTs in the master test slots 756 and/or slave test slots 758 to provide to the MoCA LAN harness(es) 704 DOCSIS/WAN, provisioning/SIP and/or other test data over the coaxial cable(s) 768. In various implementations, the master test system 752 may configure the DUTs in the master test slots 756 to test resources within those DUTs. The slave test systems 754 may configure DUTs in the slave test slots 758 to test resources within those DUTs. In various implementations, the master-to-device interface 770 may allow signals to pass from the master test system 752 to the DUTs in the master test slots 756 while accommodating attenuation, e.g., due to the input cable(s) 762. The slave-to-device interface 772 may allow signals to pass from the slave test systems 754 to the DUTs in the slave test slots 758 while accommodating attenuation, e.g., due to the input cable(s) 764.

The elements and/or couplings shown in FIG. 7A are by way of example only, and it is noted that various implementations may use couplings that differ, at least in part, from the couplings shown in FIG. 7A. As an example, in some implementations, each of the master test slots 756 and/or the slave test slots 758 may have a specific FXO server, MoCA LAN harness etc. associated with it, and/or coupled to DUTs housed therein. In these implementations, the FXO server 714 may represent a plurality of FXO servers, each coupled to DUTs in the master test slots 756/slave test slots 758 by independent Ethernet/telephony cables. The MoCA LAN harness(es) 704 may represent a plurality of MoCA LAN harnesses, each coupled to the DUTs in the master test slots 756/slave test slots 758 by independent coaxial cables and/or Ethernet/telephony cables.

Figure 7B:
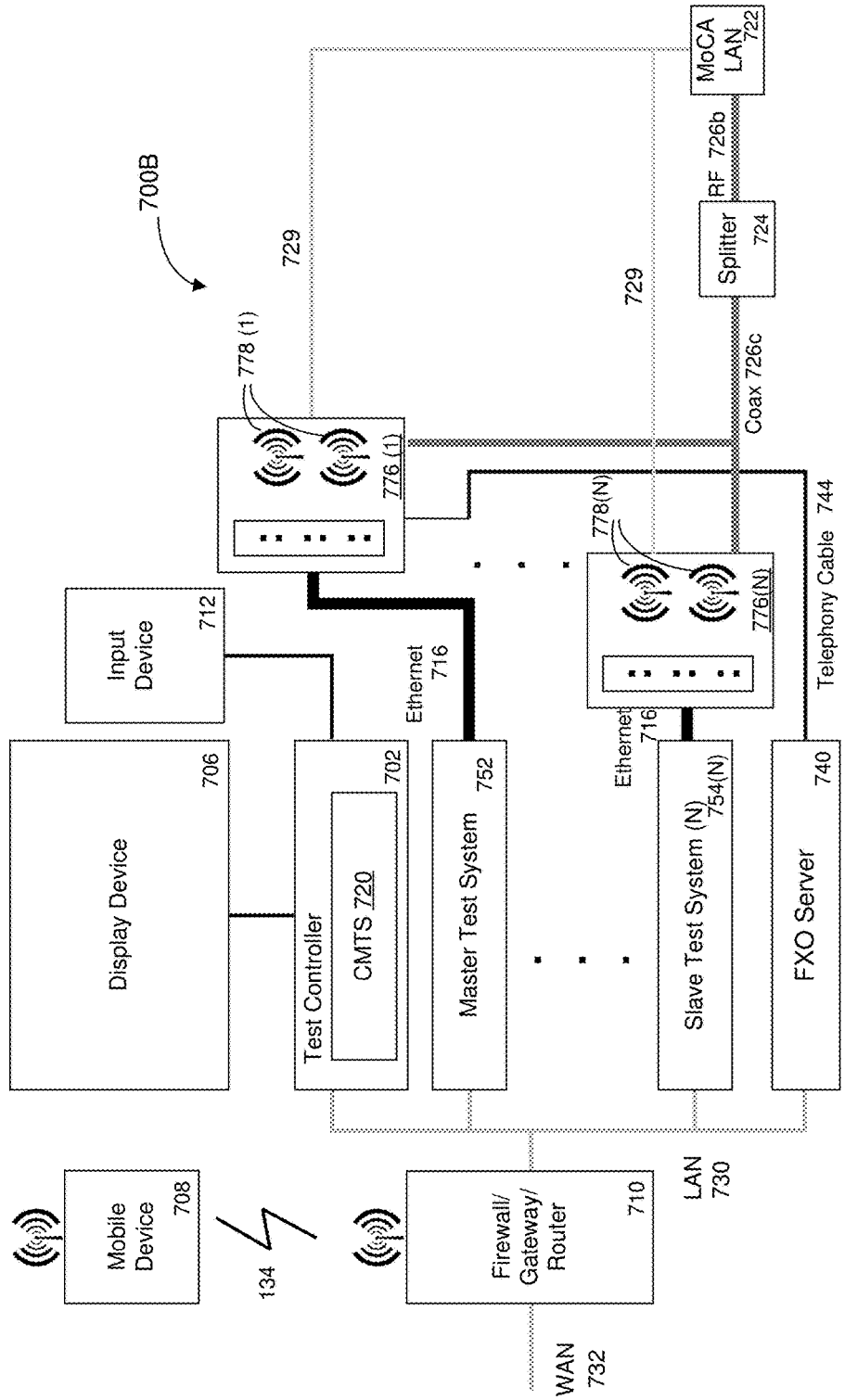
FIG. 7B illustrates a high-level hardware architecture of a testing network for cable modem tests using a master test system and a plurality of slave test systems, according to some implementations.

FIG. 7B illustrates a high-level hardware architecture of a testing network 700B for cable modem tests using a master test system and a plurality of slave test systems, according to some implementations. The testing network 700B may include the test controller 702, the display device 706, the mobile device 708, the firewall/gateway/router 710, the input device 712, an Ethernet connection 716, a CMTS 720 within the test controller 702, a MoCA LAN unit 722, a splitter 724, an RF cable 726a, an RF cable 726b, a coaxial cable 726c, a LAN 730, a WAN 732, an FXO server 740, a local router 742, a telephony cable 744, a master test system 752, slave test systems 754, test slots 776 (e.g., master test slot 776(1) through slave test slot 776(N)), and DUTs 778 (e.g., DUTs 778(1) through DUT 778(N)). One or more components of the testing network 700B may correspond to one or more components of the testing network 700A. The components referenced in FIG. 7B may be configured similarly and/or may operate similarly to one or more components of FIG. 1 and/or FIG. 7A.

Figure 8:
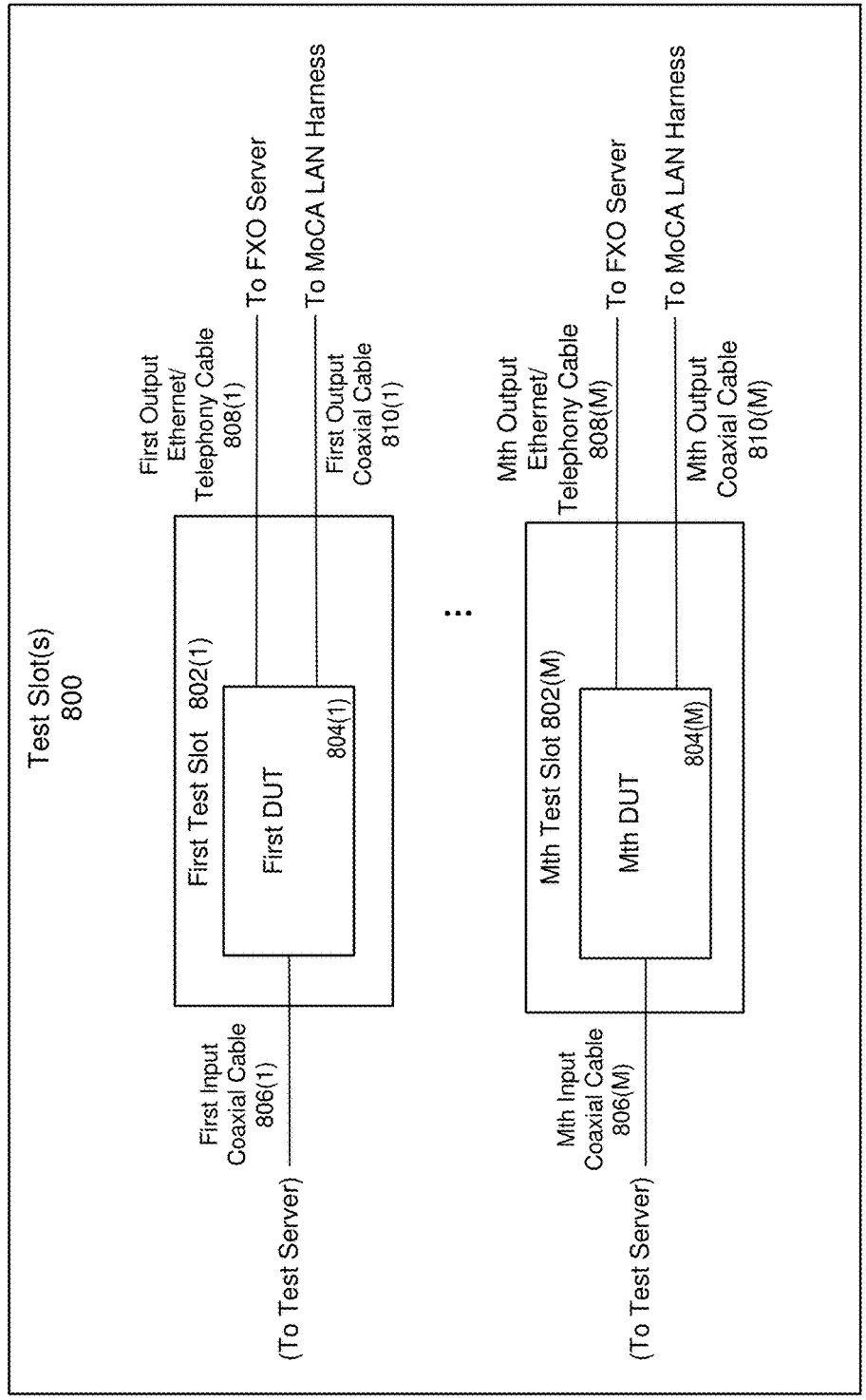
FIG. 8 illustrates a hardware architecture of a plurality of tests slots used in a test system for cable modem tests, according to some implementations.

FIG. 8 illustrates a hardware architecture of a plurality of test slots 800 used in the testing network 700A, according to some implementations. The plurality of test slots 800 may correspond to at least portions of the master test slots 756 or the slave test slots 758, shown in FIG. 7A and discussed further herein. The test slots 800 may include a first test slot 802(1) through an Mth test slot 802(M). Each of the test slots 800 may enclose an electromagnetically shielded region in which DUTs reside. As a result, each of the test slots 800 may include a DUT therein. The first test slot 802(1) may include a first DUT 804(1), for instance, and the Mth test slot 802(M) may include an Mth DUT 804(M). The test slots 800 may be physically arranged similarly to the master test slots 756 or the slave test slots 758, shown in FIG. 7A.

The test slots 800 may comprise openings to receive Ethernet/telephony cables and/or coaxial cables. The first test slot 802(1), for instance, may include an opening for receiving a first input coaxial cable 806(1) that couples the first DUT 804(1) to a test system (e.g., to the master test system 752 or a slave test systems 754). The first test slot 802(1) may also include openings for a first output Ethernet/telephony cable 808(1) that couples the first DUT 804(1) to the FXO server 714, and for a first output coaxial cable 810(1) that couples the first DUT 804(1) to the MoCA LAN harness(es) 704. The Mth test slot 802(M) may include an opening for receiving a Mth input coaxial cable 806(M) that couples the Mth DUT 804(M) to a test system (e.g., to the master test system 752 or a slave test systems 754), an opening for a Mth output Ethernet/telephony cable 808(M) that couples the Mth DUT 804(M) to the FXO server 714, and an opening for an Mth output coaxial cable 810(M) that couples the Mth DUT 804(M) to the MoCA LAN harness(es) 704.

The input Ethernet/telephony cable(s) 806 may be coupled to a device interface, such as the master-to-device interface 770 and/or the slave-to-device interface 772. An example of a device interface to which the input Ethernet/telephony cable(s) 806 may be coupled is shown in the hardware architecture 900 in FIG. 9.

FIG. 9 illustrates a hardware architecture 900 that includes a device interface 904 coupling a test system 902 to a DUT 906, according to some implementations. The test system 902 may comprise a CMTS 908, a diplexer 910, a first RF tap 912, and a second RF tap 914. The CMTS 908 may include some or all of the components of the CMTS 120 shown in FIG. 1 and discussed further herein. The CMTS 908 may be coupled to the diplexer 910 via an upstream path (US) and a downstream path (DS). The signal level along the downstream path may be characterized by a first signal level (e.g., 45 decibels (dB)).

The diplexer 910 comprises a circuit that couples the upstream path of the CMTS 908, the downstream path of the CMTS 908, and an input port of the first RF tap 912 to one another. In this example, the diplexer 910 may exhibit a first specified signal loss (e.g., 1.3 dB), that causes the signal out of the diplexer 910 to have a second (and reduced) signal level (e.g., 43.7 dB). In various implementations, the diplexer 910 may be implemented as a frequency domain multiplexer.

The first RF tap 912 comprises a circuit configured to receive data from the CMTS, provide a test signal via device output ports (e.g., eight) to respective device interfaces 904 (only one shown), and to pass the test signal via a pass-through port to the second RF tap 914. In this example, the first RF tap 912 may exhibit a 1.7 dB loss from the input port to the pass-through output port, which results in a signal of 42 dB being provided to the second RF tap 914. The first RF tap 912 may exhibit a 23 dB loss from the input port to each device output port, which results in a signal of 20.7 dB being provided to the device interface 904.

The second RF tap 914 may comprise a circuit configured similarly to the first RF tap 912. The second RF tap 914 may be configured to receive data from the pass-through port of the first RF tap 912, provide a test signal via device output ports (e.g., eight) to respective device interfaces 904 (none shown), and to pass the test signal via a pass-through port to another RF tap (e.g., of another rack). In this example, the second RF tap 914 may exhibit a 1.7 dB loss from the input port to the pass-through output port, which results in a signal of 40.3 dB being provided to the next RF tap. The second RF tap 914 may exhibit a 23 dB loss from the input port to each device output port, which results in a signal of 19 dB being provided to the respective device interfaces 904.

The device interface 904 may comprise a circuit configured to couple the test system 902 to the DUT 906, while accommodating attenuation between the test system 902 and the DUT 906. The device interface 904 may include a MoCA filter 916, a first attenuator 918, an RF splitter 920, a LAN bridge 922, and a second attenuator 924. The MoCA filter 916 may comprise a filter for MoCA signals, including the test signal from the device output port of the first RF tap 912. The MoCA filter 916 may be coupled between a device output port of the first RF tap 912 and the first attenuator 918. The first attenuator 918 may be configured to attenuate the filtered test signal output from the MoCA filter 916 to the DUT 906 by a specified value (e.g., 10 dB). The first attenuator 918 may provide the attenuated filtered test signal to an input port of the RF splitter 920. The LAN bridge 922 may be coupled to the second attenuator 924, which may attenuate a LAN signal (e.g., a configuration test signal) from the LAN bridge 922 by a specified value (e.g., 20 dB). The second attenuator 924 may provide the attenuated LAN signal to a second input port of the RF splitter 920. The RF splitter 920 may provide with both the attenuated LAN signal and the attenuated filtered test signal to the DUT 906. The signals through the RF splitter may be further attenuated, e.g., by 6.5 dB to 4.2 dB.

FIG. 10 illustrates a master test system 752, according to some implementations. The master test system 752 may include an Ethernet/telephony interface 1002, a coaxial interface 1004, control servers 1006, and a plurality of RF taps 1008 (shown in FIG. 10 as first RF tap 1008(1) through Lth RF tap 1008(L)). The Ethernet/telephony interface 1002 may comprise hardware, software, and/or firmware configured to couple the master test system 752 to one or more Ethernet/telephony cables (e.g., the Ethernet/telephony cable(s) 766). The coaxial interface 1004 may comprise hardware, software, and/or firmware configured to couple the master test system 752 to one or more coaxial cables, such as the coaxial cable(s) 760.

The control servers 1006 may comprise hardware, software, and/or firmware configured to provide instructions to perform tests on DUTs in the master test slots 756. The control servers 1006 may further comprise hardware, software, and/or firmware configured to provide instructions to manage tests performed by the slave test systems 754 on DUTs in the slave test slots 758. The control servers 1006 may include shared test protocol servers 1010, a master resource server 1012, a slave test system control server 1014, a master test management server 1016, and a master probe container 1018.

The shared test protocol servers 1010 may be configured to identify shared test protocols. Shared test protocols, as described herein, may refer to test protocols that test compliance of any shared functional parameters that are shared by different DUTs, such as the DUTs in the master test slots 756 and the DUTs in the slave test slots 758. The shared test protocol servers 1010 may include a provisioning/SIP server 1020, a CMS server 1022, a DOC SIS/WAN server 1024, and a CMTS 1025.

The provisioning/SIP server 1020 may be configured to support test protocols that test whether or not DUTs in the master test slots 756 and/or the slave test slots 758 are appropriately provisioned. Provisioning, as used herein, may include the process of configuring DUTs as well as any processes related to ensuring DUTs are configured to access network and/or other external resources. Provisioning may be related to a DUT's ability to access Voice over IP (VoIP) capabilities. In some implementations, the provisioning/SIP server 1020 may support test protocols that test connectivity and/or other provisioning settings of DUTs. In some implementations, the provisioning/SIP server 1020 is configured to test Dynamic Host Configuration Protocol (DHCP) parameters, the ability of DUTs to obtain Internet Protocol (IP) addresses, etc. The provisioning/SIP server 1020 may identify DUTs by Media Access Card (MAC) addresses and/or other attributes. The provisioning/SIP server 1020 may maintain an error log of whether or not specific DUTs could be appropriately provisioned according to test protocols.

The CMS server 1022 may be configured to support test protocols that test whether or not DUTs in the master test slots 756 and/or slave test slots 758 can appropriately route calls internally or to other DUTs. In various implementations, the CMS server 1022 tests rules, parameters, etc., governing the routing of telephone calls through the DUTs and/or the network coupled to the DUTs. The CMS server 1022 may test how the DUTs distribute calls according to time(s), date(s), and/or location(s). The CMS server 1022 may be configured to test calling features of DUTs (e.g., call queues, Interactive Voice Response (IVR) capabilities, Recorded announcements). The CMS server 1022 may test call logging capabilities of DUTs. In some implementations, the CMS server 1022 may maintain an error log of whether or not specific DUTs were able to appropriately route calls according to test protocols.

The DOCSIS/WAN server 1024 may be configured to support test protocols that test whether or not DUTs in the in the master test slots 756 and/or slave test slots 758 comply with DOC SIS standards. In various implementations, the DOC SIS/WAN server 1024 tests rules, parameters, etc. governing the ability of DUTs to send and/or receive data in accordance with DOC SIS standards. The DOCSIS/WAN server 1024 may maintain an error log of whether or not specific DUTs were able to comply with DOCSIS standards.

The CMTS 1025 may be configured to incorporate functionalities of a cable modem termination system. The CMTS 1025 may provide one or more functionalities provided by the CMTS 120, shown in FIG. 1, and discussed further herein.

The master resource server 1012 may be configured to support test protocols that test resources on DUTs in the master test slots 756. The test protocols implemented by the master resource server 1012 may provide DUTs in the master test slots 756 with resource requests (memory resource requests, processor resource requests, audio/video resource requests, network resource requests, other types of hardware resource requests, etc.), and determine whether or not those DUTs are able to satisfy the resource requests. In some implementations, the master resource server 1012 may maintain an error log of whether or not specific DUTs could satisfy resource requests according to test protocols.

The slave test system control server 1014 may be configured to provide instructions to control the slave test system 754 and/or DUTs in slave test slots 758 coupled to the slave test system 754. In some implementations, the slave test system control server 1014 provides the slave test systems 754 with identifiers of DUTs to test. The slave test system control server 1014 may provide the slave test systems 754 with instructions to configure one or more resource probes at those slave test systems. In various implementations, the slave test system control server 1014 may provide specific test protocols to the slave test system 754 to provide to DUTs in the slave test slots 758. The slave test system control server 1014 may provide identifiers of specific DUTs in the slave test slots 758 that are to be tested under various testing protocols.

The master test management server 1016 may be configured to identify specific DUTs and/or tests for specific DUTs in the master test slots 756 and/or the slave test slots 758. The master test management server 1016 may be configured to select various tests for both DUTs in the master test slots 756 and the slave test slots 758, including provisioning/SIP tests, CMS tests, DOCSIS/WAN tests, CMTS-related tests, etc. The master test management server 1016 may be configured select tests of resources of DUTs in the master test slots 756.

The master probe container 1018 may be configured to create, manage, etc. comprise a set of probes for accessing ports of DUTs in the master test slots 756. The master probe container 1018 may include probes for accessing ports associated with shared test protocols (LAN ports, Wi-Fi ports, SIP ports, provisioning ports, FXS ports, MoCA ports, etc.) and/or resource test protocols. FIG. 11 shows an example of the master probe container 1018 in greater detail.

The RF taps 1008 may comprise RF taps configured to couple the master test system 752 to device interfaces 904, e.g., as shown in FIG. 9.

FIG. 11 illustrates a master test system 752 coupled to a device interface 1102 and to a DUT 804, according to some implementations. The device interface 1102 may include an RF splitter 1026 coupled to a LAN bridge 1028. The DUT 804 may include a LAN port 1042, a Wi-Fi port 1044, an SIP port 1046, a provisioning port 1048, and an FXS port 1050.

The master test system 752 may include a master probe container 1018, which may include one or more LAN probes 1030, one or more Wi-Fi probes 1032, one or more SIP probes 1034, one or more provisioning probes 1036, one or more FXS probes 1038, and/or one or more MoCA probes 1040. In some embodiments, the LAN port 1042 may be coupled to the LAN probe 1030; the Wi-Fi port 1044 may be coupled to the Wi-Fi probe 1032; the SIP port 1046 may be coupled to the SIP probe 1034; the provisioning port 1048 may be coupled to the provisioning probe 1036; the FXS port 1050 may be coupled to the FXS probe 1038; and the RF splitter 1026 may be coupled to the MoCA probe 1040. The master probe container 1018 may be configured to virtualize and/or otherwise support probes configured to gather data from ports of DUTs in the master test slots 756 and/or the slave test slots 758 in accordance with test protocols.

Figure 12:
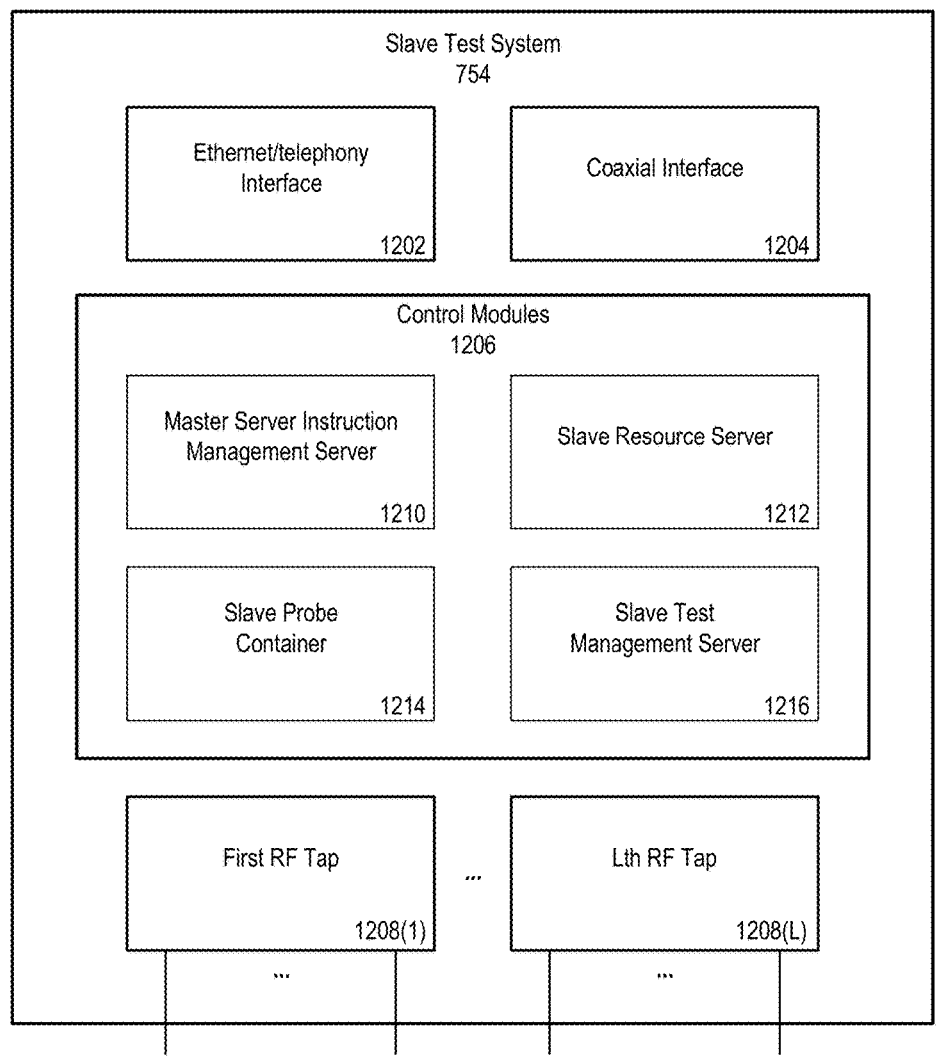
FIG. 12 illustrates a slave test system, according to some implementations.

FIG. 12 illustrates a slave test system 754, according to some implementations. The slave test system 754 may include an Ethernet/telephony interface 1202, a coaxial interface 1204, control servers 1206, and a plurality of RF taps 1208 (shown as first RF tap 1208(1) through Lth RF tap 1208(L)). The Ethernet/telephony interface 1202 may comprise hardware, software, and/or firmware configured to couple the slave test system 754 to one or more Ethernet/telephony cables (e.g., the Ethernet/telephony cables 766). The coaxial interface 1204 may comprise hardware, software, and/or firmware configured to couple the slave test system 754 to one or more coaxial cables, such as the coaxial cable(s) 768.

The control servers 1206 may comprise hardware, software, and/or firmware configured to provide instructions to perform tests on DUTs in the slave test slots 758. The control servers 1206 may further comprise hardware, software, and/or firmware configured to receive instructions from the master test system 752 to perform tests on the DUTs in the slave test slots 758. The control servers 1206 may include a master server instruction management server 1210, a slave resource server 1212, a slave probe container 1214, and a slave test management server 1216.

The master server instruction management server 1210 may be configured to process instructions from the master test system 752 to perform tests on the DUTs in the slave test slots 758. In various implementations, the master server instruction management server 1210 receives instructions from the master test system 752 regarding provisioning/SIP test protocols, CMS test protocols, DOCSIS/WAN test protocols, and test protocols originating from a CMTS. The master server instruction management server 1210 may provide information related to provisioning/SIP test protocols, CMS test protocols, DOCSIS/WAN test protocols, test protocols originating from a cable modem termination system, etc. to DUTs in the slave test slots 758.

The slave resource server 1212 may be configured to support test protocols that test resources on DUTs in the slave test slots 758. The test protocols implemented by the slave resource server 1212 may provide DUTs in the slave test slots 758 with resource requests (memory resource requests, processor resource requests, audio/video resource requests, network resource requests, other types of hardware resource requests, etc.), and determine whether or not those DUTs are able to satisfy the resource requests. In some implementations, the slave server resource server 1212 may maintain an error log of whether or not specific DUTs could satisfy resource requests according to test protocols.

Figure 13:
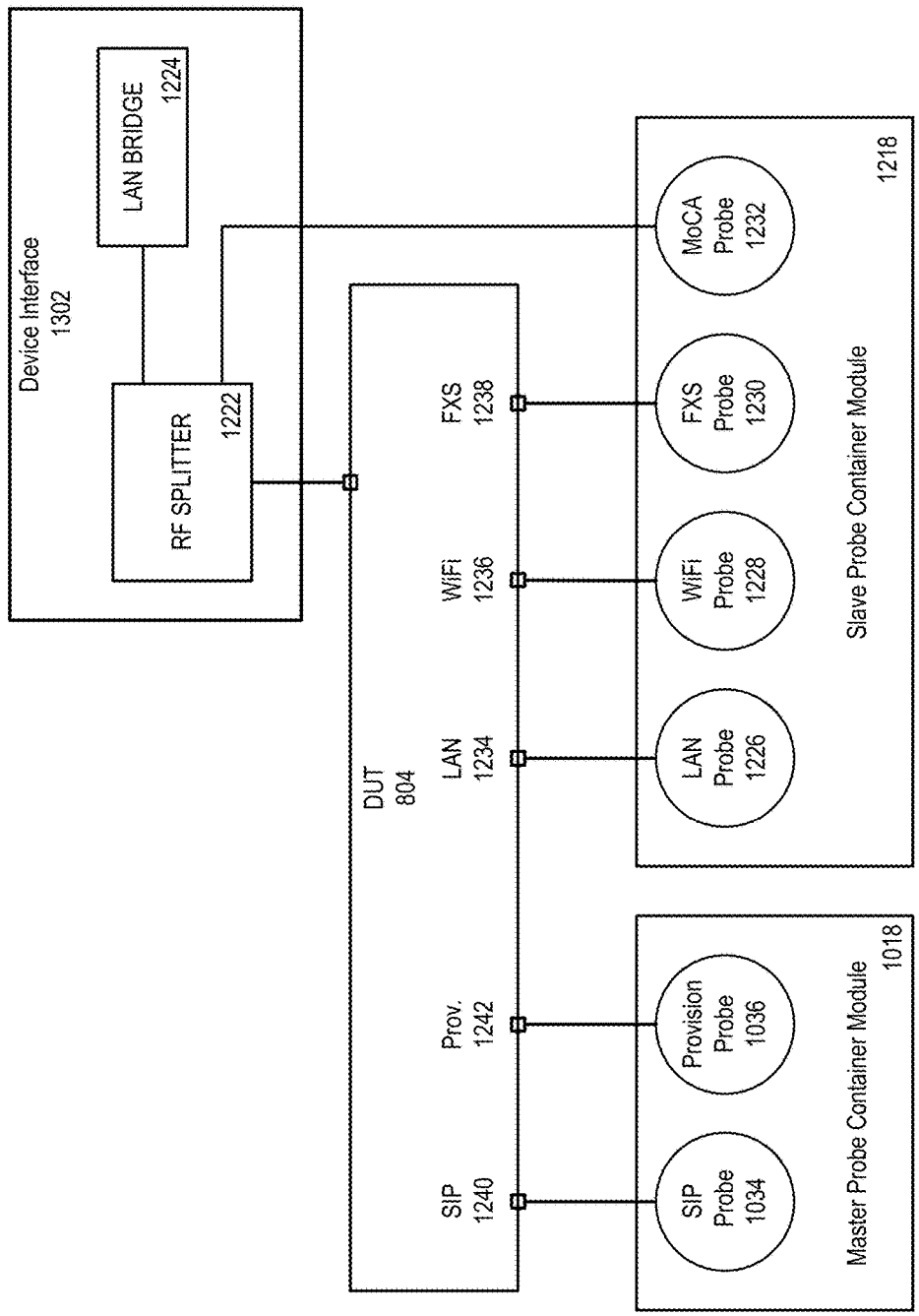
FIG. 13 illustrates a master test system and a slave test system coupled to a device interface and a DUT, according to some implementations

The slave probe container 1214 may comprise a set of probes for accessing ports of DUTs in the slave test slots 758. The slave probe container 1214 may include probes for accessing LAN ports, Wi-Fi ports, FXS ports, MoCA ports, etc. FIG. 13 shows an example of the slave probe container 1214 in greater detail.

The slave test management server 1216 may be configured to identify specific DUTs and/or tests for specific DUTs in the slave test slots 758. The slave test management server 1216 may be configured to select various tests including provisioning/SIP tests, CMS tests, DOCSIS/WAN tests, CMTS-related tests, tests of resources, etc.

The RF taps 1208 may comprise RF taps configured to couple the slave test system 754 to device interfaces 904, e.g., as shown in FIG. 9.

FIG. 13 illustrates a master test system 752 and a slave test system 754 coupled to a device interface 1302 and a DUT 804, according to some implementations. The device interface 1302 includes an RF splitter 1222 coupled to a LAN bridge 1224. The DUT 804 may include a LAN port 1234, a Wi-Fi port 1236, an SIP port 1240, a provisioning port 1242, and an FXS port 1238.

In some embodiments, the master probe container 1018 may include probes for the DUTs within the master test slots 756 and probes for the DUTs within the slave test slots 758. That way, the master test system 752 can gather and evaluate the test results from each of the tests performed on the DUTs of both the master and slave racks. For example, the master test system 752 may couple the SIP probe 1034 and the provisioning probe 1036 of the master probe container 1018 respectively to the SIP port 1240 and to the provisioning port 1242 of the DUT 804. In other embodiments, probes within the master probe container 1018 may receive test results from probes within the slave probe container 1218 for evaluation by the master test system 752.

In some embodiments, the master probe container 1018 may include probes to the DUTs within the master test slots 756 alone, e.g., when the tests must be done locally, when the demands would be too onerous, or under other circumstances. In such embodiments, the slave probe container 1218 may have local probes to the DUTs within the slave test slots 758. For example, the slave test system 754 may include one or more LAN probes 1226, one or more Wi-Fi probes 1228, one or more FXS probes 1230, and one or more MoCA probes 1232.

In some embodiments, the LAN port 1234 may be coupled to the LAN probe 1226; the Wi-Fi port 1236 may be coupled to the Wi-Fi probe 1228; the FXS port 1238 may be coupled to the FXS probe 1230; the SIP port 1240 may be coupled to the SIP probe 1034; the provisioning port 1242 may be coupled to the provisioning probe 1036; and the splitter 1222 may be coupled to the MoCA probe 1232. The slave probe container 1018 may be configured to virtualize and/or otherwise support probes configured to gather data from ports of DUTs in the slave test slots 758 in accordance with test protocols.

Figure 14:
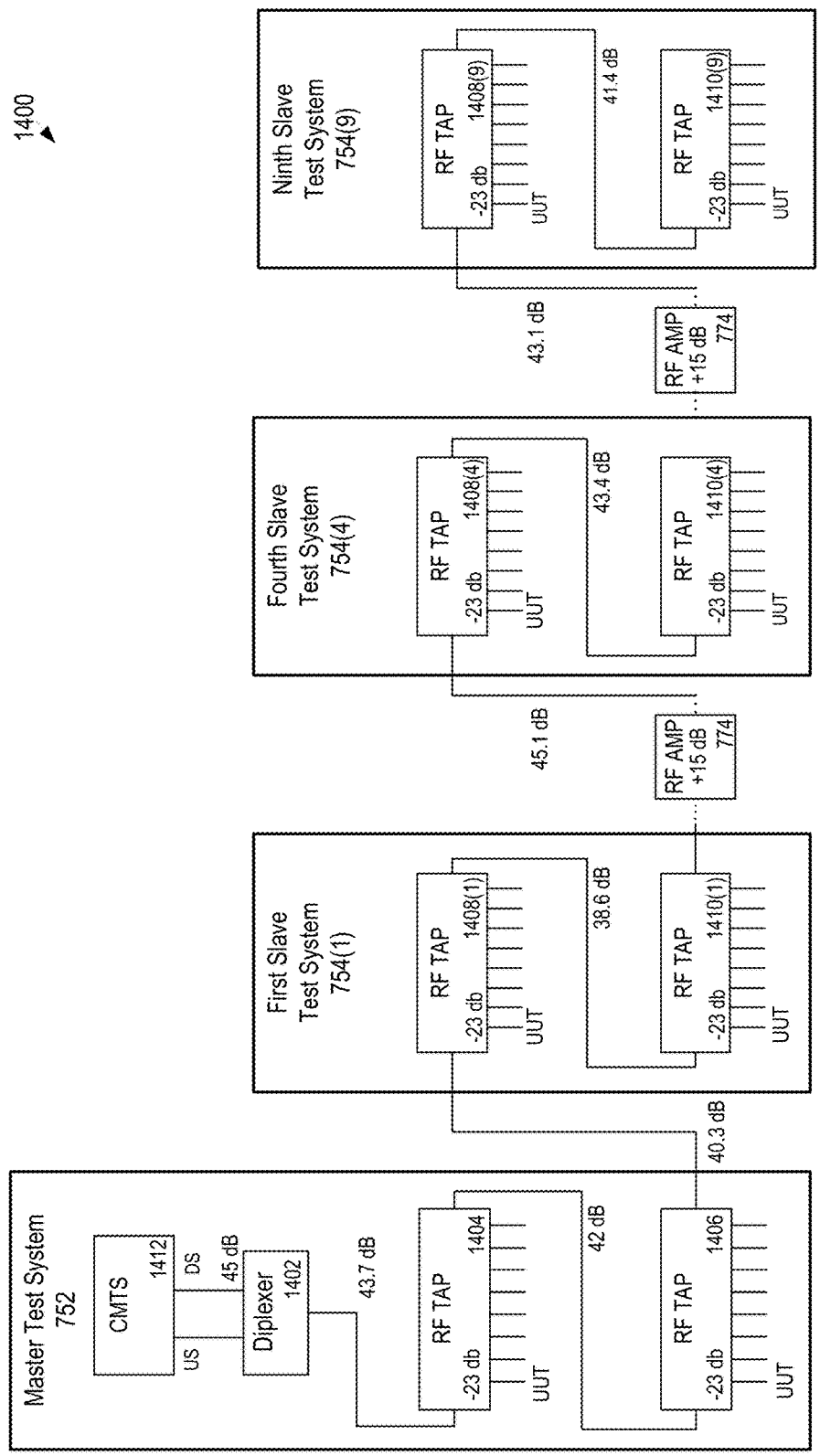
FIG. 14 illustrates a high-level hardware architecture of a testing network for cable modem tests using a master test system and a plurality of slave test systems, according to some implementations.

FIG. 14 illustrates a high-level hardware architecture of a testing network 1400 for cable modem tests using a master test system 752 and a plurality of slave test systems 754, according to some implementations. The testing network 1400 may include several, e.g., nine, slave test systems 754 (shown as a first slave test system 754(1), a fourth slave test system 754(4), and a ninth slave test system 754(9)).

The master test system 752 may include a CMTS 1412, a diplexer 1402, a first RF tap 1404, and a second RF tap 1406. Each slave test system 754 may comprise a first RF tap 1408 and a second RF tap 1410. The diplexer 1402 exhibits a 1.3 dB loss. Each RF tap 1404-1410 exhibits a 1.7 db loss from its input port to its pass-through output port. Accordingly, in this example, the master test system 752 includes one diplexer 1402 and two RF taps 1404, 1406, and exhibits a 4.7 dB loss. If the master test system 752 receives a 45 dB signal, it will provide a 40.3 dB signal to the first slave test system 754(1). Each slave system 754 includes two RF taps 1408, 1410, and thus exhibits a 3.4 dB loss across it.

To account for this signal loss, an amplifier 774 may be positioned between each rack and/or between groups of racks. In the present example, a 15 dB amplifier 774 is positioned between the third and fourth rack to account for the 14.9 dB loss across the master rack (4.7 dB) and the three slave racks (3×3.4 dB=10.2 dB).

As shown, the fourth slave test system 754(4) receives the 45.1 dB test signal. In the example, there is another 15 dB amplifier 774 positioned between the eighth and ninth slave test system 54. Accordingly, the five slave systems exhibit a 17 dB loss (5×3.4 dB=17 dB), and the ninth slave test system 754(9) receives a 43.1 dB signal.

Although the amplifiers 774 are being shown as both being 15 dB amplifiers, different sized amplifiers may be used. They need not be the same. The amplifiers may be selected/configured based on the signal degradation, and may account for additional losses, such as line and/or other component losses.

Figure 15:
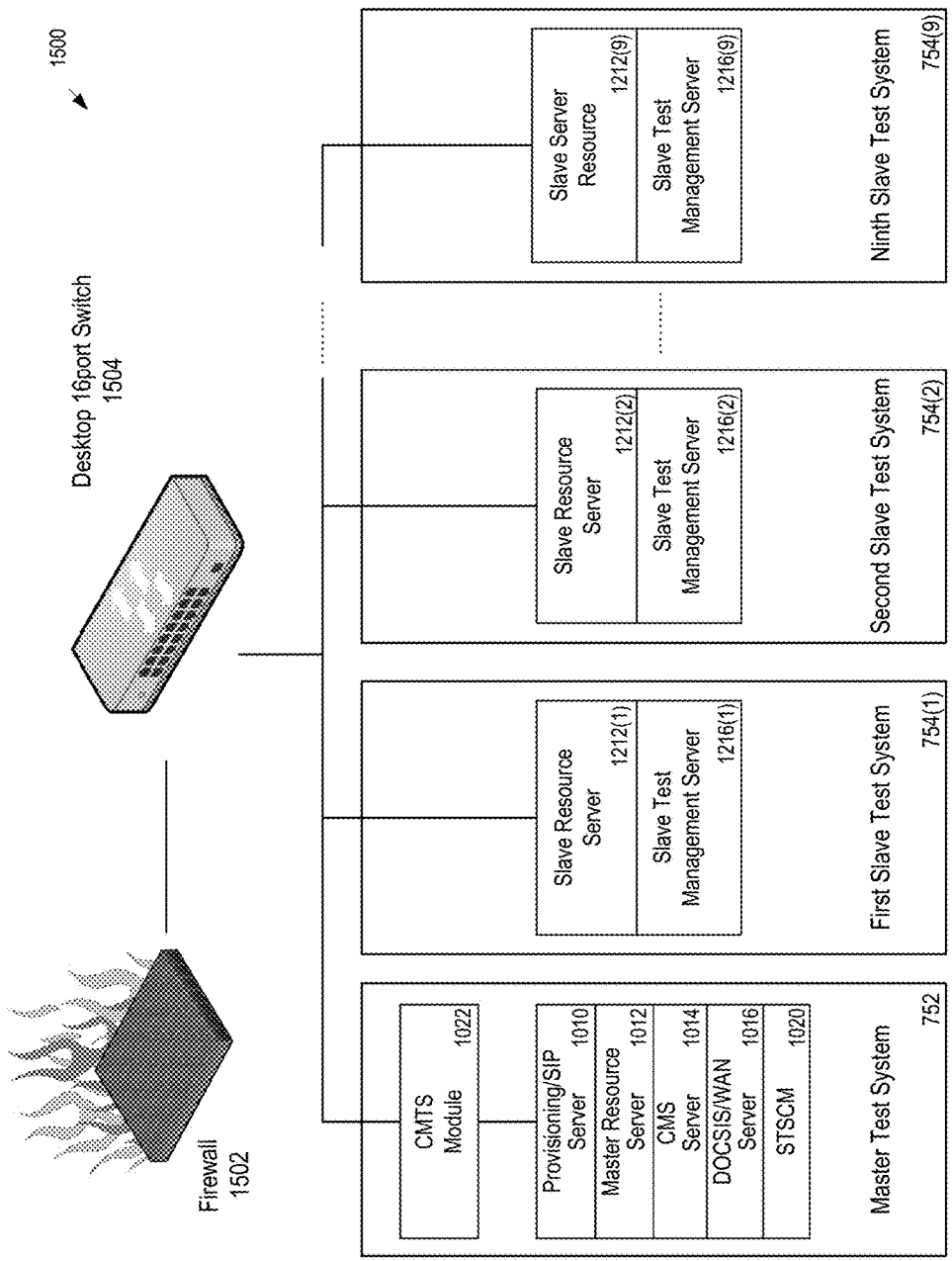
FIG. 15 illustrates a high-level system architecture of a testing network for cable modem tests using a master test system and a plurality of slave test systems, according to some implementations.

FIG. 15 illustrates a high-level system architecture of a testing network 1500 for cable modem tests using a master test system 752 and a plurality of slave test systems 754, according to some implementations. The testing network 1500 may include a firewall 1502, a switch 1504, the master test system 752, and a plurality of slave test systems (shown as a first slave test system 754(1), a second slave test system 754(2), and a ninth slave test system 754(9)). The desktop switch 1504 may be configured to couple the firewall 1502 to the master test system 752 and the slave test systems 754. The master test system 752 may include the CMTS 1025, the provisioning/SIP server 1020, the master resource server 1012, the CMS server 1022, the DOCSIS/WAN server 1024, and the slave test system control server 1014. Each slave test system 754 may include the slave resource server 1212 and the slave test management server 1216.

Figure 16:
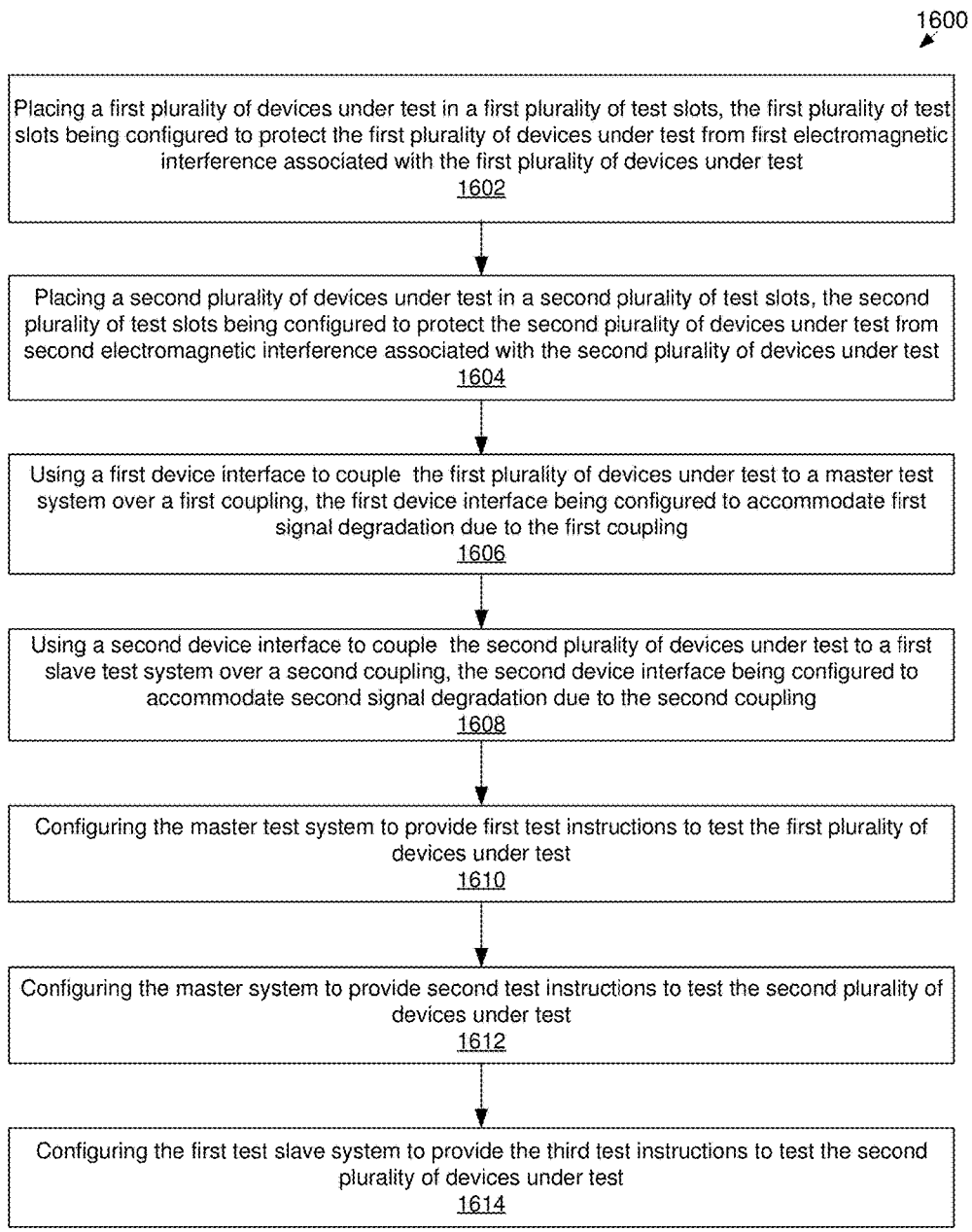
FIG. 16 illustrates a flowchart of a method for testing a cable modem in one or more slots using a master test system and a plurality of slave test systems, according to some implementations.

FIG. 16 illustrates a flowchart of a method 1600 for testing a cable modem in one or more slots using a master test system and a plurality of slave test systems, according to some implementations. The method 1600 may be executed using the structures in the testing network 700A, shown in FIG. 7A and discussed herein.

At an operation 1602, a first plurality of devices under test may be placed in a first plurality of test slots. The first plurality of test slots may be configured to protect the first plurality of devices under test from first electromagnetic interference associated with the first plurality of devices under test. In some implementations, a tester may place a first plurality of DUTs in the master test slots 756. The first plurality of DUTs may reside in Faraday cages and/or other magnetically/electromagnetically shielded structures corresponding to specific test of the master test slots 756. One or more of the first plurality of DUTs may comprise cable modems, embedded Multimedia Terminal Adapters (eMTAs), etc.

At an operation 1604, a second plurality of devices under test may be placed in a second plurality of test slots, the second plurality of test slots being configured to protect the second plurality of devices under test from second electromagnetic interference associated with the second plurality of devices under test. In some implementations, a tester may place a second plurality of DUTs in the slave test slots 758 (e.g., the first slave test slots 758(1)). The second plurality of DUTs may reside in Faraday cages and/or other magnetically/electromagnetically shielded structures corresponding to specific test of the slave test slots 758. One or more of the second plurality of DUTs may comprise cable modems, embedded Multimedia Terminal Adapters (eMTAs), etc.

At an operation 1606, a first device interface may be used to couple the first plurality of devices under test to a master test system over a first coupling, the first device interface being configured to accommodate first signal degradation due to the first coupling. A tester may couple the input cable(s) 762 to the DUTs in the master test slots 756 and the master test system 752. The tester may place the master-to-device interface 770 within the signal path of the DUTs in the master test slots 756 and the master test system 752. The master-to-device interface 770 may, as discussed herein, reduce effects of attenuation due to the configuration of one or more of the master test system 752, the input cable(s) 762, and the DUTs in the master test slots 756.

At an operation 1608, a second device interface may be used to couple the second plurality of devices under test to a first slave test system over a second coupling, the second device interface being configured to accommodate second signal degradation due to the second coupling. A tester may couple the input cable(s) 764 to the DUTs in the slave test slots 785 and the slave test system 754. The tester may place the slave-to-device interface 772 within the signal path of the DUTs in the slave test slots 758 and the slave test system 754. The slave-to-device interface 772 may reduce effects of attenuation due to the configuration of one or more of the slave test system 754, the input cable(s) 764, and the DUTs in the slave test slots 758.

At an operation 1610, the master test system may be configured to provide first test instructions to test the first plurality of devices under test. In some implementations, a tester may provide instructions to the master test system 752 through the test controller 702 and/or the mobile device 708 to configure the master test system 752 to provide instructions to the DUTs in the master test slots 756. The master test system 752 may also be configured automatically without human intervention, etc. The first test instructions may comprise instructions to test the DUTs in the master test slots 756 in accordance with shared test protocols, resource test protocols, etc.

At an operation 1612, the master test system 752 may be configured to provide second test instructions to test the second plurality of devices under test (e.g., to DUTs in the slave test slots 758). The second test instructions may comprise instructions to test the DUTs in the slave test slots 758 in accordance with shared test protocols, etc.

At an operation 1614, the first slave test system may be configured to provide the second test instructions to test the second plurality of devices under test. In some implementations, the slave test systems 754 may be configured (though the test controller 702, the mobile device 708, automatically, etc.) to provide the third test instructions to test the DUTs in the slave test slots 758. The third test instructions may comprise instructions to test the DUTs in the slave test slots 758 in accordance with resource test protocols, etc.

Figure 17:
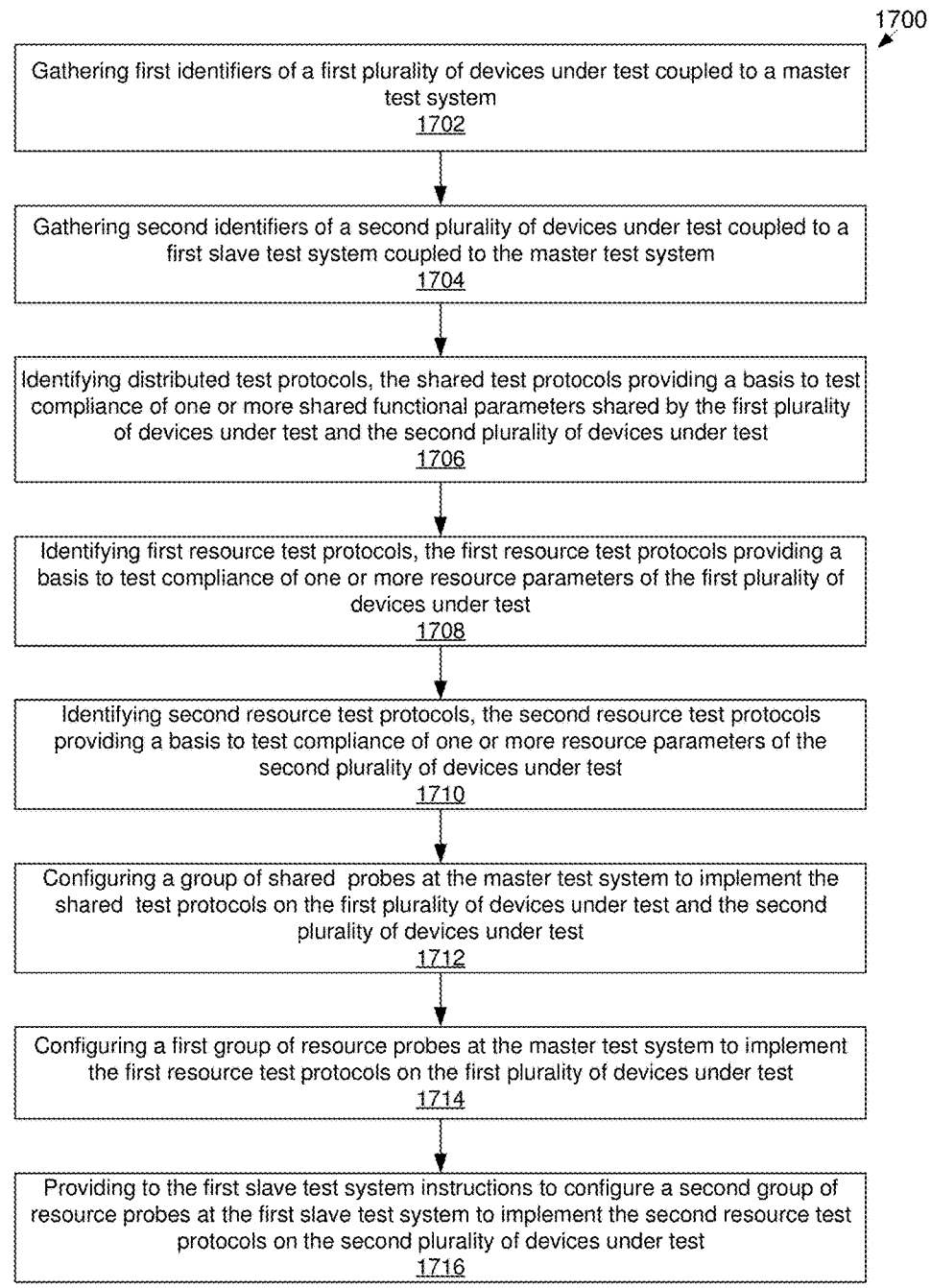
FIG. 17 illustrates a flowchart of a method for testing a cable modem in one or more slots using a master test system and a plurality of slave test systems, according to some implementations.

FIG. 17 illustrates a flowchart of a method 1700A for testing a cable modem in one or more slots using a master test system 752 and a plurality of slave test systems 754, according to some implementations. The method 1700A may be executed using the structures in the master test system 752 and/or the slave test systems 754, shown in FIG. 7A, FIG. 10, FIG. 11, FIG. 12, and/or FIG. 13, and discussed further herein.

At an operation 1702, first identifiers of a first plurality of devices under test coupled to a master test system 752 may be gathered. In various implementations, the master test management server 1016 may be configured to gather first identifiers of DUTs in the master test slots 756. The first identifiers may correspond to any convenient way to identify the DUTs in the master test slots 756, including, but not limited to MAC address identifiers. In some implementations, the first identifiers correspond to values obtained from bar codes or other codes read in by the input device 712.

At an operation 1704, second identifiers of a second plurality of devices under test coupled to a first slave test system coupled to the master test system may be gathered. In various implementations, the master test management server 1016 may be configured to gather second identifiers of DUTs in the slave test slots 758. The second identifiers may correspond to any convenient way to identify the DUTs in the slave test slots 758, including, but not limited to MAC address identifiers. In some implementations, the second identifiers correspond to values obtained from bar codes or other codes read in by the input device 712.

At an operation 1706, shared test protocols that provide a basis to test compliance of one or more shared functional parameters shared by the first plurality of devices under test and the second plurality of devices under test may be identified. The shared test protocol server(s) 1010 may identify shared test protocols that provide a basis to test compliance of one or more shared functional parameters shared by the first plurality of devices under test and the second plurality of devices under test. In various implementations, the provisioning/SIP server 1020, the CMS server 1022, the DOC SIS/WAN server 1024, and/or the CMTS 1025 may identify corresponding test protocols that provide a basis to test compliance of one or more shared functional parameters shared by the first plurality of devices under test and the second plurality of devices under test.

At an operation 1708, first resource test protocols that provide a basis to test compliance of one or more resource parameters of the first plurality of devices under test may be identified. The master resource server 1012 may identify first resource test protocols that provide a basis to test compliance of one or more resource parameters of the DUTs in the master test slots 756.

At an operation 1710, second resource test protocols that provide a basis to test compliance of one or more resource parameters of the second plurality of devices under test may be identified. The master resource server 1012 may identify second resource test protocols that provide a basis to test compliance of one or more resource parameters of the DUTs in the slave test slots 758.

At an operation 1712, a group of shared probes may be configured at the master test system to implement the shared test protocols on the first plurality of devices under test and the second plurality of devices under test. In some implementations, the master probe container 1018 may configure a group of shared probes to implement the shared test protocols on the DUTs in the master test slots 756 and/or the DUTs in the slave test slots 758. The master probe container 1018 may identify one or more test probe containers that correspond to the group of shared probes, where the one or more test probe containers comprise virtual representations of the group of shared probes.

At an operation 1714, a first group of resource probes may be configured at the master test system to implement the first resource test protocols on the first plurality of devices under test. In some implementations, the master probe container 1018 may configure a first group of resource probes to implement the first resource test protocols on the DUTs in the master test slots 756. The master probe container 1018 may identify one or more test probes that correspond to the first group of resource probes, where the one or more test probes comprise virtual representations of the first group of resource probes.

At an operation 1716, the first slave test system may be provided instructions to configure a second group of resource probes at the first slave test system to implement the second resource test protocols on the second plurality of devices under test. More particularly, the slave test system control server 1014 may provide instructions to the slave test system(s) 754 to configure a second group of resource probes at the slave test system(s) 754 to implement the second resource test protocols on the DUTs in the slave test slots 758.

FIG. 18 depicts an example of a digital device 1800, according to some implementations. The digital device 1800 comprises a processor 1805, a memory system 1810, a storage system 1815, a communication network interface 1820, an I/O interface 1825, a display interface 1830, and a bus 1835. The bus 1835 may be communicatively coupled to the processor 1805, the memory system 1810, the storage system 1815, the communication network interface 1820, the I/O interface 1825, and the display interface 1830.

In some implementations, the processor 1805 comprises circuitry or any processor capable of processing the executable instructions. The memory system 1810 comprises any memory configured to store data. Some examples of the memory system 1810 are storage devices, such as RAM or ROM. The memory system 1810 may comprise the RAM cache. In various implementations, data is stored within the memory system 1810. The data within the memory system 1810 may be cleared or ultimately transferred to the storage system 1815.

The storage system 1815 comprises any storage configured to retrieve and store data. Some examples of the storage system 1815 are flash drives, hard drives, optical drives, and/or magnetic tape. In some implementations, the digital device 1800 includes a memory system 1810 in the form of RAM and a storage system 1815 in the form of flash data. Both the memory system 1810 and the storage system 1815 comprise computer readable media which may store instructions or programs that are executable by a computer processor including the processor 1805.

The communication network interface (com. network interface) 1820 may be coupled to a data network. The communication network interface 1820 may support communication over an Ethernet connection, a serial connection, a parallel connection, or an ATA connection, for example. The communication network interface 1820 may also support wireless communication (e.g., 802.1 a/b/g/n, WiMAX, LTE, 3G, 2G). It will be apparent to those skilled in the art that the communication network interface 1820 may support many wired and wireless standards.

The I/O interface 1825 may comprise any device that receives input from the user and output data. The display interface 1830 may comprise any device that may be configured to output graphics and data to a display. In one example, the display interface 1830 is a graphics adapter.

It will be appreciated by those skilled in the art that the hardware elements of the digital device 1800 are not limited to those depicted in FIG. 18. A digital device 1800 may comprise more or less hardware elements than those depicted. Further, hardware elements may share functionality and still be within various implementations described herein. In one example, encoding and/or decoding may be performed by the processor 1805 and/or a co-processor located on a GPU.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some implementations", "various implementations", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some implementations, but also variously omitted in other embodiments. Similarly, various features are described that may be preferences or requirements for some implementations, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the claims recited herein.

The invention claimed is:

1. A system comprising:
a test controller for controlling the testing of a plurality of devices under test;
a master test system including a cable modem termination system (CMTS) and configured to:
receive first test instructions and second test instructions from the test controller;
provide, via the CMTS and first RF taps, the first test instructions to a first subset of the plurality of devices under test to test the first subset of the plurality of devices under test, the first subset of the plurality of devices under test being housed in a first plurality of test slots, the first plurality of test slots being configured to protect the first subset of the plurality of devices under test from electromagnetic interference; and
a first plurality of device interfaces connected to the first taps and configured to couple the master test system to the first subset of the plurality of devices under test, the first plurality of device interfaces being configured to accommodate first signal degradation;
a slave test system coupled to the master test system, the slave test system configured to receive the second test instructions from the CMTS and provide, via second RF taps, the second test instructions to a second subset of the plurality of devices under test, the second subset of the plurality of devices under test being housed in a second plurality of test slots, the second plurality of test slots being configured to protect the second subset of the plurality of devices under test from electromagnetic interference;
a second plurality of device interfaces connected to the second RF taps and configured to couple the slave test system to the second subset of the plurality of devices under test, the second plurality of device interfaces being configured to accommodate second signal degradation; and
at least one RF amplifier connected between the master test system and the slave test system to accommodate signal attenuation.

2. The system of claim 1, wherein the first subset of the plurality of devices under test comprises cable modems or Embedded Multimedia Terminal Adapters (eMTAs), or the second subset of the plurality of devices under test comprises cable modems or Embedded Multimedia Terminal Adapters (eMTAs).

3. The system of claim 1, wherein the first plurality of device interfaces comprise attenuators.

4. The system of claim 1, wherein the second plurality of device interfaces comprise attenuators.

5. The system of claim 1, wherein the first plurality of test slots or the second plurality of test slots comprise Faraday cages configured to electromagnetically shield items housed therein.

6. The system of claim 1, wherein the first plurality of test slots or the second plurality of test slots are incorporated into a test rack configured to facilitate testing of items located thereon.

7. The system of claim 1, wherein the master test system and the slave test system are coupled to one another using a coaxial line and the RF amplifier is configured to accommodate signal degradation due to the coaxial line.

8. The system of claim 1, further comprising an input device coupled to the test controller, the input device being configured to receive identifiers of the first plurality of devices under test and the second plurality of devices under test.

9. The system of claim 8, wherein the test controller and the input device are incorporated into one or more of a mobile phone, a tablet computing device, a laptop computer, and a desktop computer.

* * * * *